United States Patent

Yao et al.

[11] Patent Number: 5,956,321
[45] Date of Patent: Sep. 21, 1999

[54] STREAM SCHEDULING SYSTEM FOR REAL TIME STREAM SERVER

[75] Inventors: Hiroshi Yao; Tatsunori Kanai, both of Kanagawa-ken, Japan

[73] Assignee: Kabushiki Kaisha Toshiba, Kawasaki, Japan

[21] Appl. No.: 08/616,266

[22] Filed: Mar. 15, 1996

Related U.S. Application Data

[60] Provisional application No. 60/000,177, Jun. 13, 1995.

[30] Foreign Application Priority Data

Mar. 16, 1995 [JP] Japan ................................. 7-057384

[51] Int. Cl.⁶ ............................. H04J 3/16; G06F 13/14
[52] U.S. Cl. ......................... 370/230; 370/458; 370/462; 395/200.64; 711/167
[58] Field of Search ................................. 370/230, 235, 370/458, 231, 462, 468, 516; 395/672, 673, 674, 200.63, 200.64; 348/7, 12, 13; 711/167, 168, 169

[56] References Cited

U.S. PATENT DOCUMENTS

| | | | |
|---|---|---|---|
| 5,414,455 | 5/1995 | Hooper et al. | 348/7 |
| 5,442,390 | 8/1995 | Hooper et al. | 348/7 |
| 5,528,513 | 6/1996 | Vaitzblit et al. | 395/673 |
| 5,606,359 | 2/1997 | Youden et al. | 348/7 |
| 5,652,749 | 7/1997 | Davenport et al. | 370/466 |
| 5,708,796 | 1/1998 | Ozden et al. | 711/167 |

FOREIGN PATENT DOCUMENTS 4-269087  9/1992  Japan .

OTHER PUBLICATIONS

Tobagi et al., "Streaming RAID™—A Disk Array Management System For Video Files", *ACM Multimedia 93*, pp. 393–399.

Rangan et al., "Designing File Systems for Digital Video and Audio", Proc. of the 13th ACM Symposium, pp. 81–94.

*Primary Examiner*—Min Jung
*Attorney, Agent, or Firm*—Oblon, Spivak, McClelland, Maier & Neustadt, P.C.

[57] ABSTRACT

A stream scheduling system capable of lowering a probability for a response time of a real time stream server to exceed a specified time limit. A reference for transfer timing (reference time-slot) which can guarantee a continuity of a stream for the requested real time stream data is determined, and a transfer timing is determined in a prescribed relation to the reference time-slot while a reading timing is set movably within a prescribed tolerable range defined with respect to the reference time-slot. When a request for a transfer of a new real time stream data is received, a time-slot for a reading of another real time stream data is re-allocated within a prescribed tolerable range defined with respect to the reference time-slot for that another real time stream data so as to create a vacant time-slot, and a reading of that new real time stream data is allocated to the vacant time-slot created by re-allocation.

40 Claims, 24 Drawing Sheets

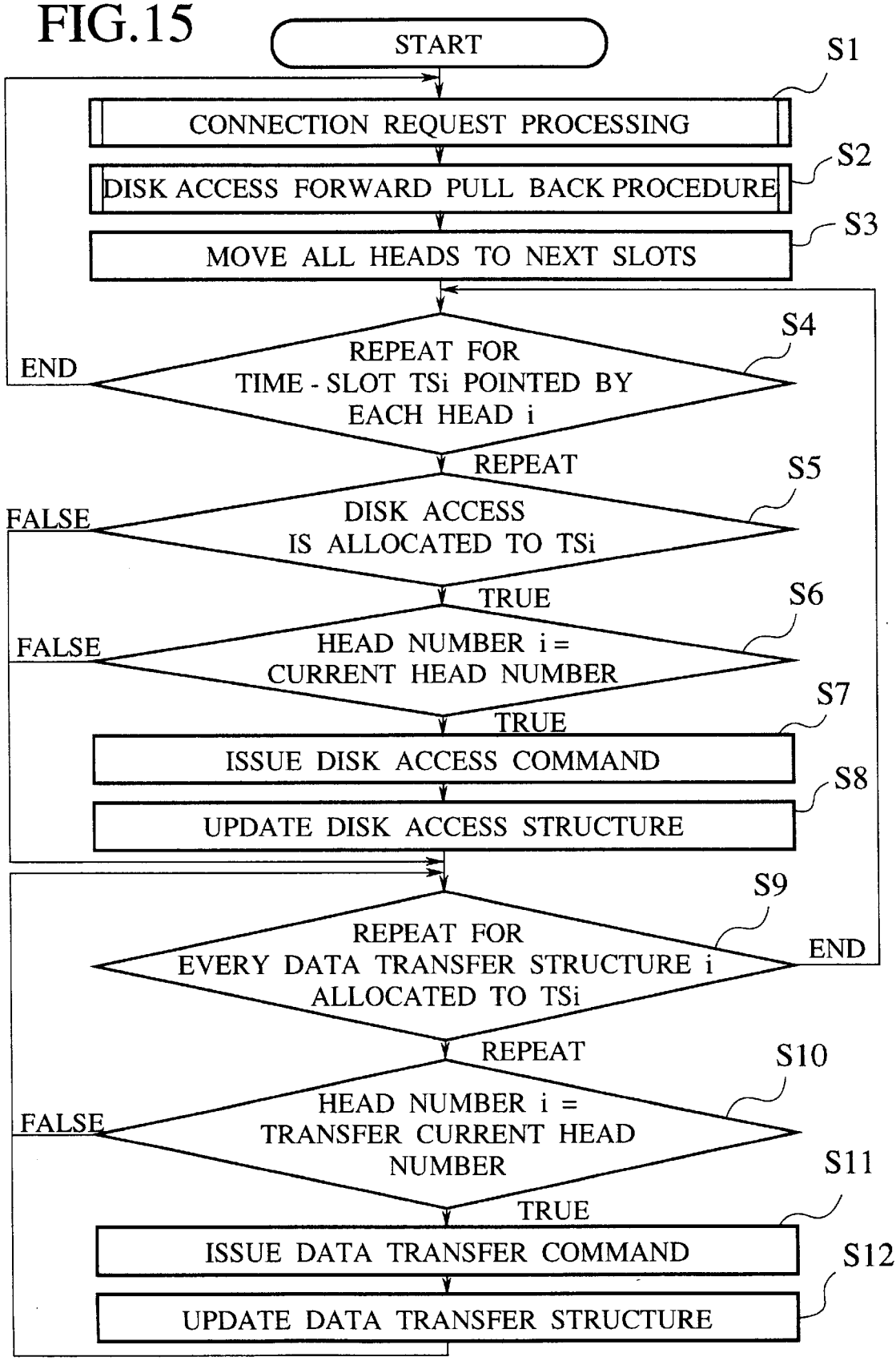

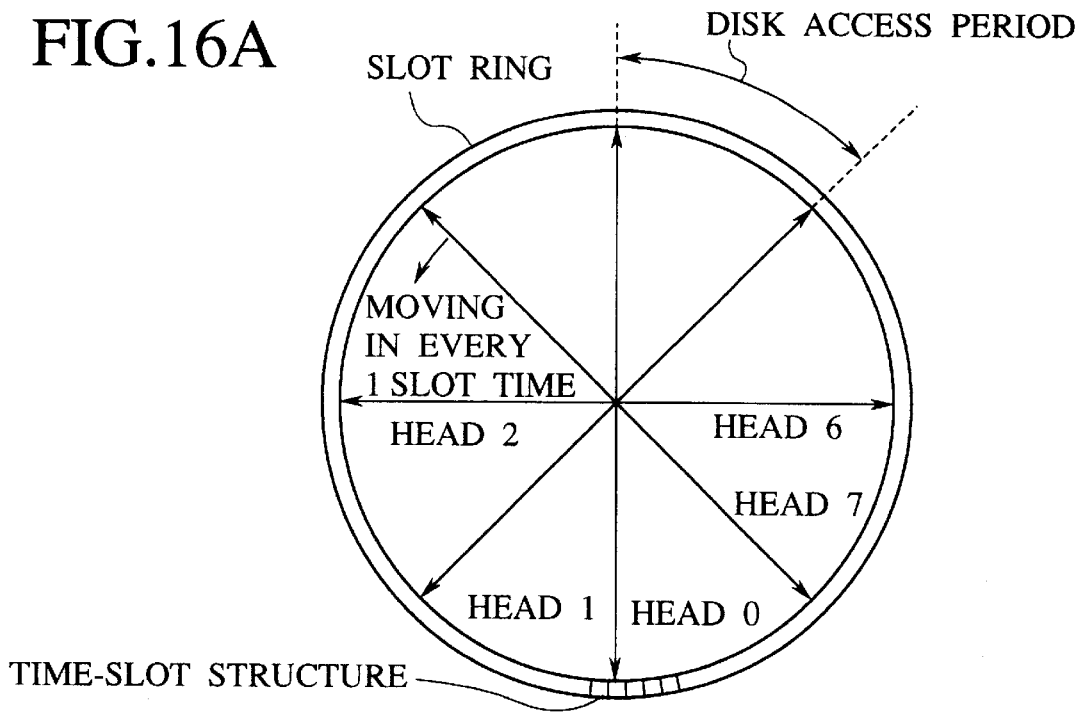

FIG.16A

SLOT RING — DISK ACCESS PERIOD

MOVING IN EVERY 1 SLOT TIME

HEAD 2, HEAD 6, HEAD 7, HEAD 0, HEAD 1

TIME-SLOT STRUCTURE

FIG.16B
TIME-SLOT STRUCTURE

| DISK ACCESS STRUCTURE ID |
| DATA TRANSFER STRUCTURE ID |
| DATA TRANSFER STRUCTURE ID |
| ⋮ |
| DATA TRANSFER STRUCTURE ID |

FIG.16C
STREAM STRUCTURE

| DISK ACCESS STRUCTURE ID |
| DATA TRANSFER STRUCTURE ID |

FIG.16D
DISK ACCESS STRUCTURE ID

| CURRENT HEAD NUMBER |
| CURRENT BLOCK NUMBER |
| STREAM STRUCTURE ID |
| BUFFER MEMORY ADDRESS |
| REFERENCE TIME-SLOT |
| TOLERABLE JITTER RANGE |

FIG.16E
DATA TRANSFER STRUCTURE

| TRANSFER CURRENT HEAD NUMBER |
| TRANSFER CURRENT BLOCK NUMBER |
| BUFFER MEMORY ADDRESS |
| CLIENT ID |

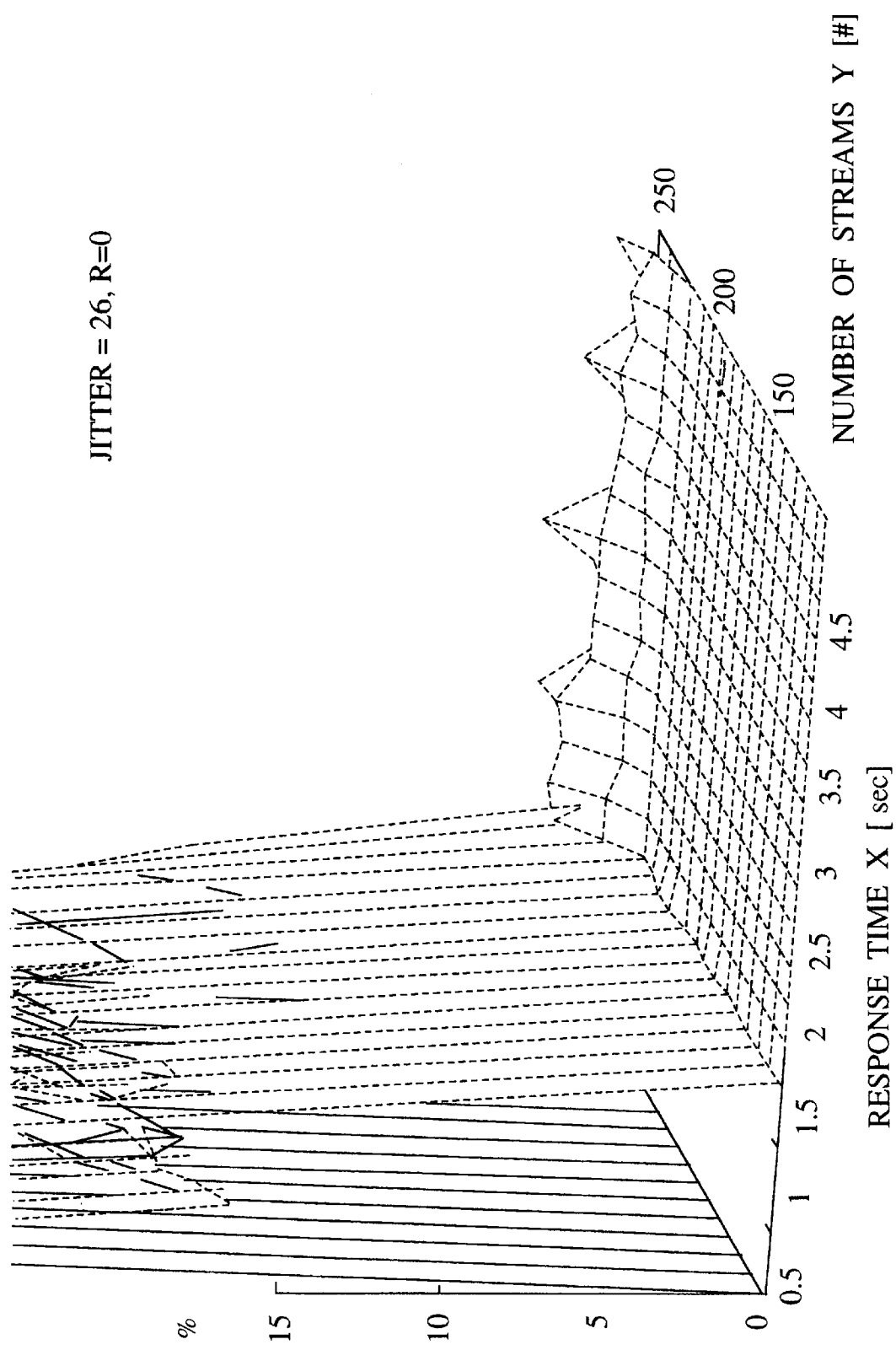

5,956,321

STREAM SCHEDULING SYSTEM FOR REAL TIME STREAM SERVER

This application is a non-provisional application of provisional application Ser. No. 60/000,177, filed Jun. 13, 1995, of which benefit of the filing date is claimed pursuant to the provisions of 35 USC §119(e).

BACKGROUND OF THE INVENTION

1. Field of the Invention

The present invention relates to stream scheduling method and apparatus suitable for a real time stream server.

2. Description of the Background Art

Data such as dynamic images and speeches which are to be sequentially transferred in real time are called real time stream data. A real time stream server for handling such real time stream data is required to be capable of transferring the real time stream data stored in disk devices to each client (such as a set top box or a personal computer connected with the real time stream server via a communication means) while guaranteeing the continuity in real time.

In order to meet this requirement, conventionally, the real time stream data are divided into blocks in units of a certain reproduction time or in units of a certain size and stored in disks, and then the server makes accesses to the disks periodically for each client. The scheme for storing data in division over a plurality of disks in this manner is called the striping, which is widely used conventionally.

The blocks read out from the disks are placed on a buffer memory once, and periodically transferred to the corresponding client via the communication network. In the real time stream server, timings for issuing a disk access command and a data transfer command in this operation are managed by a stream scheduling apparatus.

Also, the stream scheduling apparatus establishes a new stream channel by receiving a connection request from a client and scheduling a transfer of the real time stream data to that client. A stream channel for the transfer of the real time stream data from the real time stream server to the client which is established in this manner is called a stream.

In the stream scheduling apparatus, the timings for disk accesses and data transfers are managed using time-slots which divide each disk access period into constant time intervals as shown in FIG. 1. One disk access is to be allocated to one time-slot, and one block of the real time stream data is to be read out by one disk access. A disk access period for each stream is constant, and the disk access of each stream which is allocated to a particular time-slot will be fixedly allocated to that particular time-slot.

Consequently, by allocating the disk accesses of different streams to different time-slots, it becomes possible for a plurality of streams to utilize the stream data stored in the identical disk simultaneously. Here, however, as many time-slots as a number of connectable streams will be required within an access period with respect to one disk device.

The conventionally known multiple read out techniques for a case of striping data over a plurality of disks include a scheme for handling a plurality of disk devices virtually as a single high speed disk device as shown in FIG. 2, and a scheme for making an access to a disk device having a next block at each period as shown in FIG. 3.

In the examples of FIG. 2 and FIG. 3, the disk access of the stream of a client 0 is allocated to a time-slot 0 of each disk access period. A read out block A1 represents a block 1 of the real time stream data A. After A1 is read out, this A1 is transferred to the client 0 and processed (reproduced, for example) there in real time. Before the processing of A1 is finished, A2 is read out and transferred. In this manner, each stream is scheduled without affecting the continuity of the other stream. The stream scheduling apparatus maintains the continuity of each stream by repeating the operations of the reading of data from disks and the transfer of the read out data periodically, according to the schedule expressed in terms of such time-slots.

A number of streams that can be simultaneously connected to a single real time stream server is determined by a ratio M of a data transfer bit rate of a disk device with respect to a data reproduction bit rate and a number Ndisk of disk devices. Methods for increasing a number of connectable streams include a first method for increasing a transfer capability of the disk device and a second method for increasing a number disk devices to which the striping is applied.

In the first method, an average transfer rate is increased by shortening a seek time of the disk device and thereby shortening the response time of the disk device. In this method, a time period for one slot can be shortened, so that it is possible to increase the maximum number of streams.

The second method is divided into two types according to the scheduling scheme to be used. The first scheme is a scheme for handling a plurality of disk devices virtually as a single high speed disk device by reading out continuous blocks to be transferred to a single stream from a plurality of disk devices simultaneously, as shown in FIG. 2. The second scheme is a scheme for making an access to a disk device in which a next block is stored at each period, in which data for different streams are read out at a plurality of disk devices simultaneously, as shown in FIG. 3.

As can be seen in FIG. 2 and FIG. 3, a number of simultaneously connectable streams can be increased Ndisk times in both of these first and second schemes. Here, however, the access period (a number of time-slots) with respect to a certain single disk device for each stream is also increased Ndisk times.

In the real time stream server, as shown in FIG. 4, the response time is given by a total of a time since a connection request is received until a first disk access is started, a time required for the disk access, and a time for which data read out from the disk are stored in a buffer memory until the transfer to the client is started.

In practice, the delay time from a point of view of the user also includes a delay until the data are transferred to the client via the network and the reproduction of the transferred data is started at the client side, but this delay cannot be managed by the real time stream server, so that this delay will not be included in the response time here.

In a case where a connection request for a stream from a client newly occurred, the stream scheduling apparatus secures a vacant time-slot to which the disk access of the new stream can be allocated. At this point, in the conventional art, the disk accesses of the streams for which the connections are already established are fixed to the allocated time-slots, so that the stream scheduling apparatus secures a vacant time-slot subsequent to the time-slot at which the connection request has occurred, to which the already connected stream is not allocated, and whose turn comes around at the earliest timing.

In a case of securing a vacant time-slot by such a scheme, it is possible to make a response in a short time if vacant time-slots are evenly dispersed among the time-slots. However, in a case where the vacant time-slots are unevenly distributed as in a situation in which many streams are already connected to the real time stream server, there is a high probability for the response time to be long.

For this reason, in a case of setting a time limit for the response time in order to secure a certain amount of the response time, there is a high probability for the response time to exceed the time limit as the vacant time-slot to which the disk access can be allocated does not exist within the specified time limit. In particular, in a case of increasing the maximum number of connectable streams, there is a limit to the increase of the maximum number of connectable streams according to the first scheme of FIG. 2 described above, and the maximum response time becomes longer as the maximum number of connectable streams becomes larger according to the second scheme of FIG. 3 described above.

For example, in FIG. 3, in a case where the client 2m-1 issues the connection request to transfer the real time stream data F from the block 1, the disk access will not be made until a vacant time-slot becomes available for the disk device 1 which stores the block F1, that is, until the time-slot m-1 of the disk access period 2.

In recent years, with the real time stream server as a basic technique, a video server or a multimedia server has been developed, and the information service using such a server called a video-on-demand, multimedia-on-demand, or information-on-demand has been started.

Such an information system provides the service simultaneously to many users via client terminals connected by the network, using video and/or speech data which are the real time stream data or composite data in which the real time stream data are combined with conventional text and/or image data. In such a situation, many clients are going to be connected to the real time stream server simultaneously, and it has become an indispensable task to make the response time with respect to each client as short as possible.

As described above, conventionally, a timing of a disk access of a stream which is transferring data to a client is fixed on the time-slot, and the closest vacant time-slot has been allocated to a new stream for which a connection request is made.

Consequently, in a case where many streams are already connected to the real time stream server, when vacant time-slots are distributed unevenly, there is a high probability for requiring a long response time since a time at which the request for the real time stream data is received until the transfer of the first data block of the real time stream data is started.

Therefore, in a case of setting a time limit for the response time in order to secure a certain amount of the response time, there is a high probability for the response time to exceed the time limit as the vacant time-slot to which the disk access can be allocated does not exist within the specified time limit.

SUMMARY OF THE INVENTION

It is therefore an object of the present invention to provide stream scheduling method and apparatus capable of lowering a probability for a response time of a real time stream server to exceed a specified time limit.

According to one aspect of the present invention there is provided a stream scheduling method for determining a timing for reading data blocks constituting real time stream data, each real time stream data being stored in a data memory device as a plurality of data blocks, in a real time stream server which sequentially reads out data blocks of requested real time stream data from the data memory device to a buffer memory device, and transfers the data blocks stored in the buffer memory device to a communication path connected with a request source, the method comprising the steps of: determining a reference for transfer timing which can guarantee a continuity of a stream for the requested real time stream data; and setting a reading timing movably within a prescribed tolerable range defined with respect to the reference for transfer timing.

According to another aspect of the present invention there is provided a stream scheduling method for allocating a time-slot for reading data blocks constituting real time stream data, each real time stream data being stored in a data memory device as a plurality of data blocks, in a real time stream server which sequentially reads out data blocks of requested real time stream data from the data memory device to a buffer memory device, and transfers the data blocks stored in the buffer memory device to a communication path connected with a request source according to time-slots defining periodic operation timings, the method comprising the steps of: storing a reference time-slot for defining a transfer timing which can guarantee a continuity of a stream for each real time stream data; receiving a request for a transfer of a new real time stream data; re-allocating a time-slot for a reading of another real time stream data within a prescribed tolerable range defined with respect to the reference time-slot stored for said another real time stream data so as to create a vacant time-slot; and allocating a reading of said new real time stream data to the vacant time-slot created by re-allocation.

According to another aspect of the present invention there is provided a stream scheduling method for allocating a time-slot for reading data blocks constituting real time stream data, each real time stream data being stored in a data memory device as a plurality of data blocks, in a real time stream server which sequentially reads out data blocks of requested real time stream data from the data memory device to a buffer memory device, and transfers the data blocks stored in the buffer memory device to a communication path connected with a request source according to time-slots defining periodic operation timings, the method comprising the steps of: selecting candidate time-slots for which a response time does not exceed a specified time limit, as candidates for a reference time-slot for defining a transfer timing which can guarantee a continuity of a stream for the requested real time stream data, the response time being defined as a time period since a time at which a request is received until a time at which a transfer of a first data block of the requested real time stream data starts; evaluating each candidate time-slot selected at the selecting step on a basis of a dispersion of timewise positions of reference time-slots for a plurality of real time stream data estimated on an assumption of adopting each candidate time-slot; and allocating a reading of the requested real time stream data to a time-slot in relation to one of the candidate time-slots which is adopted as the reference time-slot according to an evaluation made at the evaluating step.

According to another aspect of the present invention there is provided a stream scheduling method for allocating a time-slot for reading data blocks constituting real time stream data, each real time stream data being stored in a data memory device as a plurality of data blocks, in a real time stream server which sequentially reads out data blocks of requested real time stream data from the data memory device to a buffer memory device, and transfers the data blocks stored in the buffer memory device to a communication path connected with a request source according to time-slots defining periodic operation timings, the method comprising the steps of: selecting a candidate reference time-slot for defining a transfer timing which can guarantee a continuity of a stream for the requested real time stream data, according to an evaluation of a dispersion of timewise positions of reference time-slots for a plurality of real time stream data estimated on an assumption of adopting each time-slot; selecting a candidate reading time-slot for a reading of the requested real time stream data, within a prescribed tolerable range defined with respect to the selected candidate reference time-slot; and allocating a reading of the requested real time stream data by adopting the candidate reference time-slot and the candidate reading time-slot as the reference time-slot and the reading time-slot for the requested real time stream data when the selected reading time-slot can be regarded as a vacant time-slot.

According to another aspect of the present invention there is provided a stream scheduling apparatus for determining a schedule for reading data blocks constituting real time stream data, the apparatus comprising: connection request processing means for determining a reference schedule for a requested real time stream data which can guarantee a continuity of a stream for the requested real time stream data, and an operation schedule for the requested real time stream data according to which a reading of the requested real time stream data can be carried out within a prescribed tolerable range defined with respect to the reference schedule for the requested real time stream data; and operation schedule update means for updating the operation schedule for a currently transferred real time stream data within the prescribed tolerable range defined with respect to the reference schedule for the currently transferred real time stream data.

According to another aspect of the present invention there is provided a stream scheduling apparatus for determining a schedule for reading and transfer of data blocks constituting real time stream data, the apparatus comprising: connection request processing means for determining a reference schedule for a requested real time stream data which can guarantee a continuity of a stream for the requested real time stream data and for which a timewise concentration level of reference schedules for a plurality of real time stream data estimated on an assumption of adopting said reference schedule is relatively small, and an operation schedule for the requested real time stream data according to which the reading of the requested real time stream data can be carried out within a prescribed tolerable range defined with respect to the reference schedule for the requested real time stream data; and control means for controlling the reading and the transfer of the data blocks of the requested real time stream data according to the operation schedule for the requested real time stream data determined by the connection request processing means.

According to another aspect of the present invention there is provided a stream scheduling apparatus for determining a timing for reading data blocks constituting real time stream data, each real time stream data being stored in a data memory device as a plurality of data blocks, in a real time stream server which sequentially reads out data blocks of requested real time stream data from the data memory device to a buffer memory device, and transfers the data blocks stored in the buffer memory device to a communication path connected with a request source, the apparatus comprising: means for determining a reference for transfer timing which can guarantee a continuity of a stream for the requested real time stream data; and means for setting a reading timing movably within a prescribed tolerable range defined with respect to the reference for transfer timing.

According to another aspect of the present invention there is provided a real time stream server for allocating a time-slot for reading data blocks constituting real time stream data, each real time stream data being stored in a data memory device as a plurality of data blocks, the real time stream server sequentially reads out data blocks of requested real time stream data from the data memory device to a buffer memory device, and transfers the data blocks stored in the buffer memory device to a communication path connected with a request source according to time-slots defining periodic operation timings, the real time stream server comprising: means for storing a reference time-slot for defining a transfer timing which can guarantee a continuity of a stream for each real time stream data; and means for receiving a request for a transfer of a new real time stream data, re-allocating a time-slot for a reading of another real time stream data within a prescribed tolerable range defined with respect to the reference time-slot stored for said another real time stream data so as to create a vacant time-slot, and allocating a reading of said new real time stream data to the vacant time-slot created by re-allocation.

According to another aspect of the present invention there is provided a real time stream server for allocating a time-slot for reading data blocks constituting real time stream data, each real time stream data being stored in a data memory device as a plurality of data blocks, the real time stream server sequentially reads out data blocks of requested real time stream data from the data memory device to a buffer memory device, and transfers the data blocks stored in the buffer memory device to a communication path connected with a request source according to time-slots defining periodic operation timings, the real time stream server comprising: means for selecting candidate time-slots for which a response time does not exceed a specified time limit, as candidates for a reference time-slot for defining a transfer timing which can guarantee a continuity of a stream for the requested real time stream data, the response time being defined as a time period since a time at which a request is received until a time at which a transfer of a first data block of the requested real time stream data starts; means for evaluating each candidate time-slot selected by the selecting means on a basis of a dispersion of timewise positions of reference time-slots for a plurality of real time stream data estimated on an assumption of adopting each candidate time-slot; and means for allocating a reading of the requested real time stream data to a time-slot in relation to one of the candidate time-slots which is adopted as the reference time-slot for reading according to an evaluation made by the evaluating means.

According to another aspect of the present invention there is provided a real time stream server for allocating a time-slot for reading data blocks constituting real time stream data, each real time stream data being stored in a data memory device as a plurality of data blocks, the real time stream server sequentially reads out data blocks of requested real time stream data from the data memory device to a buffer memory device, and transfers the data blocks stored in the buffer memory device to a communication path connected with a request source according to time-slots defining periodic operation timings, the real time stream server comprising: means for selecting a candidate reference time-slot for defining a transfer timing which can guarantee a continuity of a stream for the requested real time stream data, according to an evaluation of a dispersion of timewise positions of reference time-slots for a plurality of real time stream data estimated on an assumption of adopting each time-slot; means for selecting a candidate reading time-slot for a reading of the requested real time stream data, within a prescribed tolerable range defined with respect to the selected candidate reference time-slot; and means for allocating a reading of the requested real time stream data by adopting the candidate reference time-slot and the candidate reading time-slot as the reference time-slot and the reading time-slot for the requested real time stream data when the selected reading time-slot can be regarded as a vacant time-slot.

According to another aspect of the present invention there is provided an article of manufacture, comprising: a computer usable medium having computer readable program code means embodied therein for causing a computer to function as a stream scheduler for determining a timing for reading data blocks constituting realtime stream data, each real time stream data being stored in a data memory device as a plurality of data blocks, in a real time stream server which sequentially reads out data blocks of requested real time stream data from the data memory device to a buffer memory device, and transfers the data blocks stored in the buffer memory device to a communication path connected with a request source, the computer readable program means including: first computer readable program code means for causing the computer to determine a reference for transfer timing which can guarantee a continuity of a stream for the requested real time stream data; and second computer readable program code means for causing the computer to set a reading timing movably within a prescribed tolerable range defined with respect to the reference for transfer timing.

According to another aspect of the present invention there is provided an article of manufacture, comprising: a computer usable medium having computer readable program code means embodied therein for causing a computer to function as a stream scheduler for allocating a time-slot for reading data blocks constituting real time stream data, each real time stream data being stored in a data memory device as a plurality of data blocks, in a real time stream server which sequentially reads out data blocks of requested real time stream data from the data memory device to a buffer memory device, and transfers the data blocks stored in the buffer memory device to a communication path connected with a request source according to time-slots defining periodic operation timings, the computer readable program means including: first computer readable program code means for causing the computer to store a reference time-slot for defining a transfer timing which can guarantee a continuity of a stream for each real time stream data; and second computer program code means for causing the computer to receive a request for a transfer of a new real time stream data, re-allocate a time-slot for a reading of another real time stream data within a prescribed tolerable range defined with respect to the reference time-slot stored for said another real time stream data so as to create a vacant time-slot, and allocate a reading of said new real time stream data to the vacant time-slot created by re-allocation.

According to another aspect of the present invention there is provided an article of manufacture, comprising: a computer usable medium having computer readable program code means embodied therein for causing a computer to function as a stream scheduler for allocating a time-slot for reading data blocks constituting real time stream data, each real time stream data being stored in a data memory device as a plurality of data blocks, in a real time stream server which sequentially reads out data blocks of requested real time stream data from the data memory device to a buffer memory device, and transfers the data blocks stored in the buffer memory device to a communication path connected with a request source according to time-slots defining periodic operation timings, the computer readable program means including: first computer readable program code means for causing the computer to select candidate time-slots for which a response time does not exceed a specified time limit, as candidates for a reference time-slot for defining a transfer timing which can guarantee a continuity of a stream for the requested real time stream data, the response time being defined as a time period since a time at which a request is received until a time at which a transfer of a first data block of the requested real time stream data starts; second computer readable program code means for causing the computer to evaluate each candidate time-slot selected by the first computer readable program code means on a basis of a dispersion of timewise positions of reference time-slots for a plurality of real time stream data estimated on an assumption of adopting each candidate time-slot; and third computer readable program code means for causing the computer to allocate a reading of the requested real time stream data to a time-slot in relation to one of the candidate time-slots which is adopted as the reference time-slot according to an evaluation made by the second computer readable program code means.

According to another aspect of the present invention there is provided an article of manufacture, comprising: a computer usable medium having computer readable program code means embodied therein for causing a computer to function as a stream scheduler for allocating a time-slot for reading data blocks constituting real time stream data, each real time stream data being stored in a data memory device as a plurality of data blocks, in a real time stream server which sequentially reads out data blocks of requested real time stream data from the data memory device to a buffer memory device, and transfers the data blocks stored in the buffer memory device to a communication path connected with a request source according to time-slots defining periodic operation timings, the computer readable program means including: first computer readable program code means for causing the computer to select a candidate reference time-slot for defining a transfer timing which can guarantee a continuity of a stream for the requested real time stream data, according to an evaluation of a dispersion of timewise positions of reference time-slots for a plurality of real time stream data estimated on an assumption of adopting each time-slot; second computer readable program code means for causing the computer to select a candidate reading time-slot for a reading of the requested real time stream data, within a prescribed tolerable range defined with respect to the selected candidate reference time-slot; and third computer readable program code means for causing the computer to allocate a reading of the requested real time stream data by adopting the candidate reference time-slot and the candidate reading time-slot as the reference time-slot and the reading time-slot for the requested real time stream data when the selected reading time-slot can be regarded as a vacant time-slot.

Other features and advantages of the present invention will become apparent from the following description taken in conjunction with the accompanying drawings.

BRIEF DESCRIPTION OF THE DRAWINGS

FIG. 15 is a flow chart for the operation of the stream scheduling apparatus in the real time stream server of FIG. 14.

FIG. 16A, 16B, 16C, 16D and 16E are diagrams showing a slot ring, a time-slot structure, a stream structure, a disk access structure, and a data transfer structure, respectively, which are used by the steam scheduling apparatus in the real time stream server of FIG. 14 in the operation according to FIG. 15.

FIG. 24 is a histogram of response time obtained by a stream scheduling scheme according to the present invention under another exemplary condition.

DETAILED DESCRIPTION OF THE PREFERRED EMBODIMENTS

Referring now to FIG. 5 to FIG. 13, the first embodiment of a stream scheduling apparatus for a real time stream server according to the present invention will be described in detail.

Figure 1:
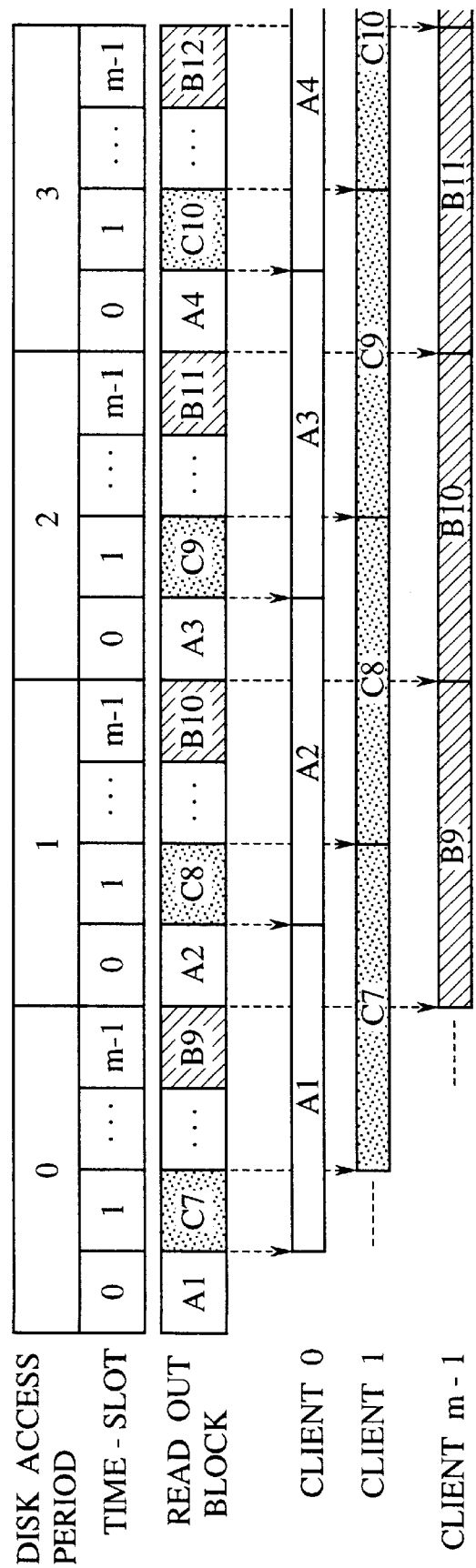
FIG. 1 is a timing chart for time-slots used in managing timings for disk accesses and data transfers in a conventional stream scheduling apparatus.
Figure 2:
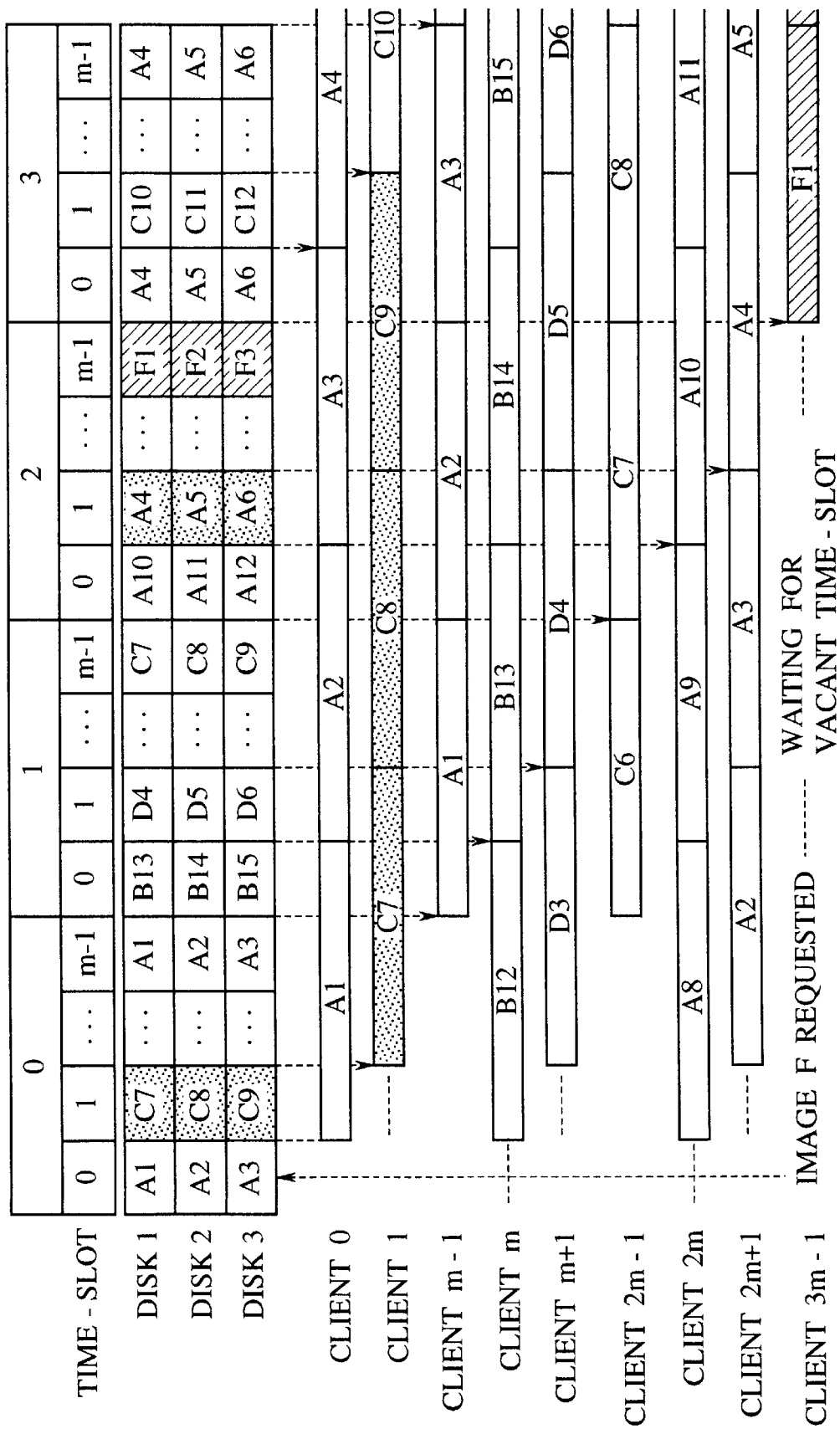
FIG. 2 is a timing chart for a conventional multiple read out scheme for handling a plurality of disk devices virtually as a single high speed disk device.
Figure 3:
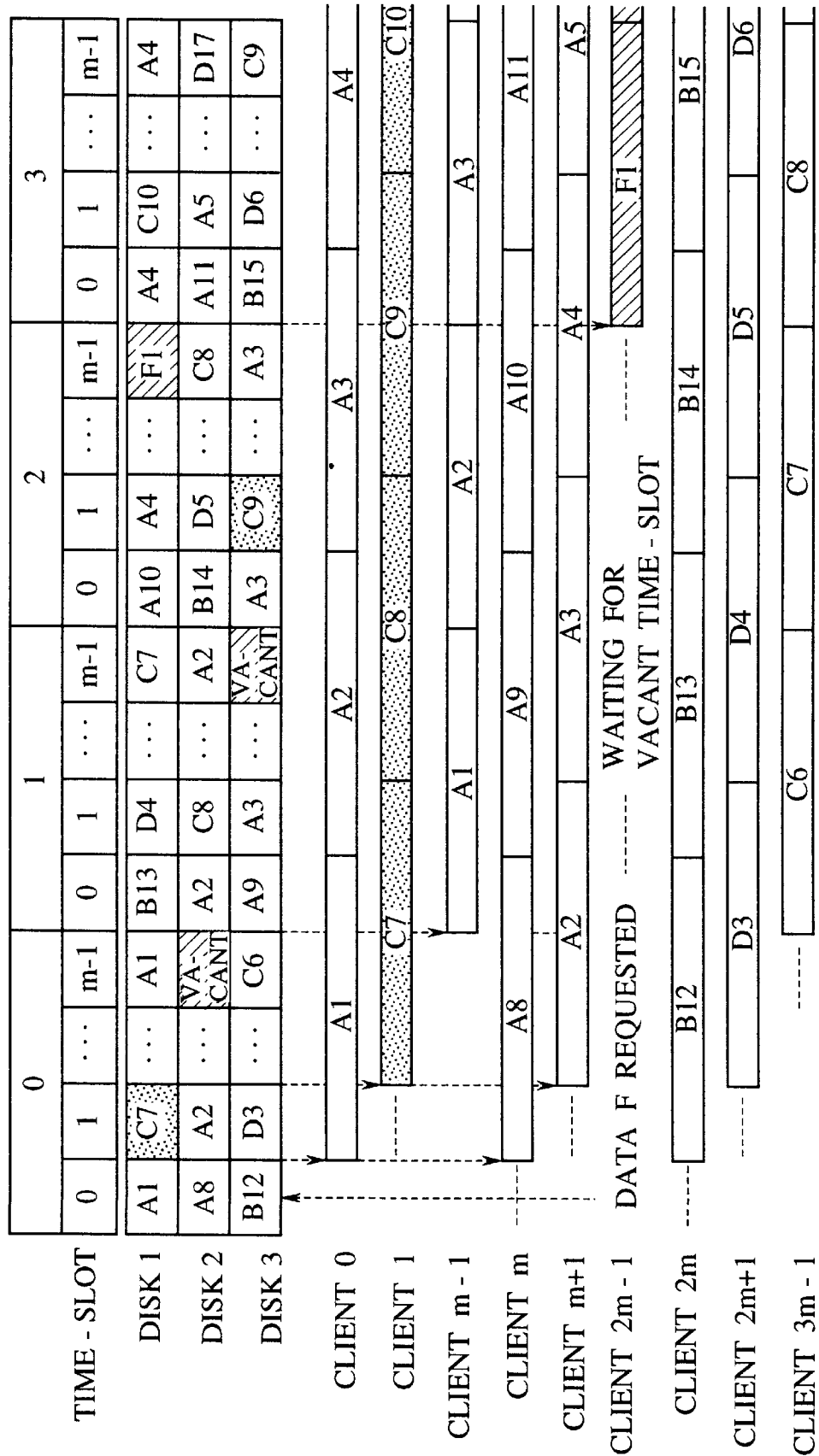
FIG. 3 is a timing chart for a conventional multiple read out scheme for making an access to a disk device having a next block at each one period.
Figure 4:
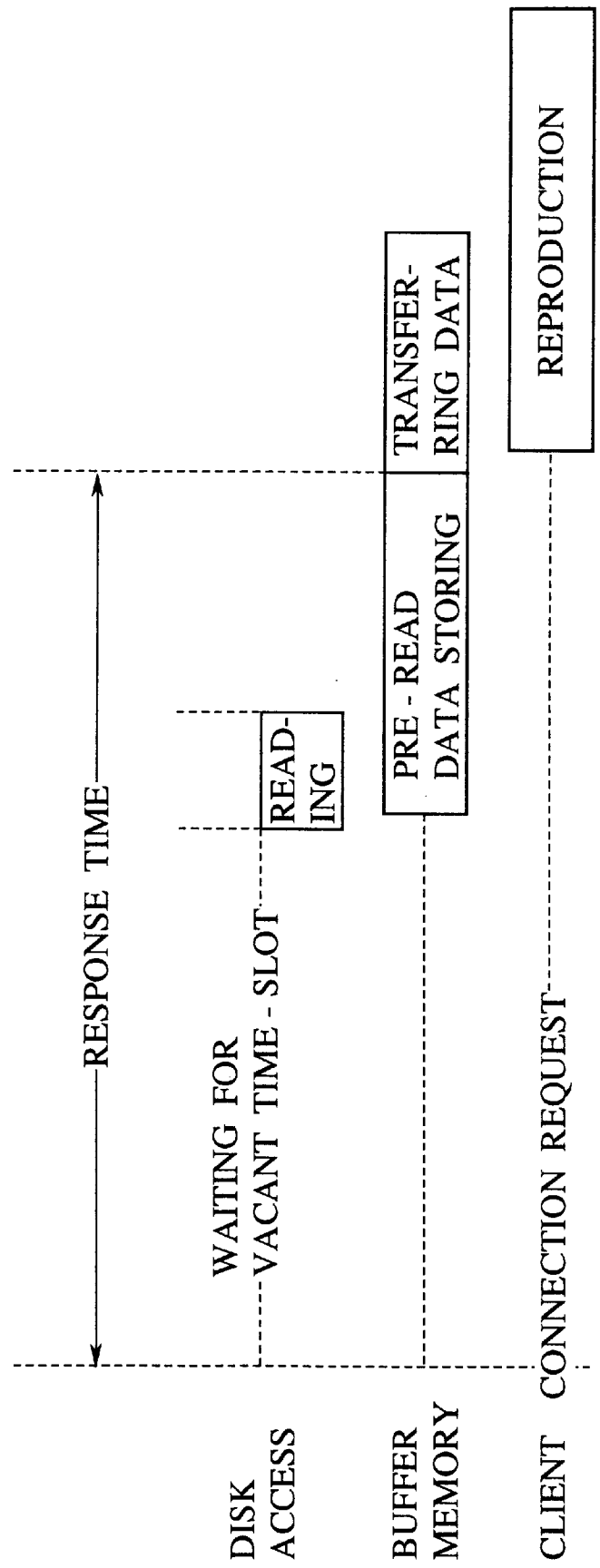
FIG. 4 is a diagram showing a response time in a conventional real time stream server.
Figure 5:
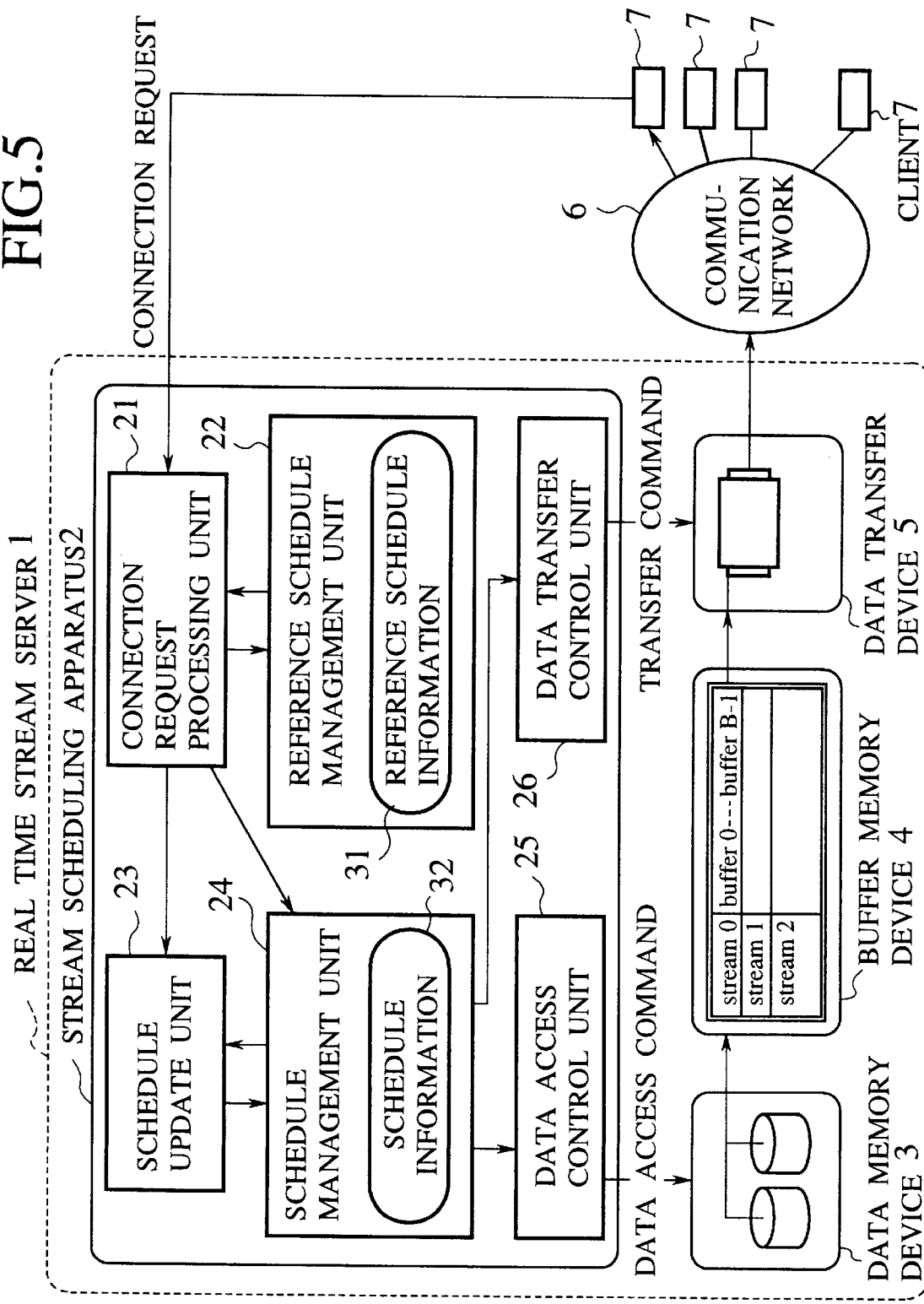
FIG. 5 is a block diagram of a first embodiment of a real time stream server using a stream scheduling apparatus according to the present invention.

In this first embodiment, a real time stream server has an overall configuration as shown in FIG. 5, where a real time stream server 1 comprises a data memory device 3 for storing real time stream data, a buffer memory device 4 for temporarily storing data read out from the data memory device 3, a data transfer device 5 for transferring data read out to the buffer memory device 4 to a client 7 via a communication network 6, and a stream scheduling apparatus 2 for commanding operations with respect to the data memory device 3 and the data transfer device 5.

The data memory device 3 can be realized by various types of memory devices such as magnetic disks, semiconductor memories, optical disks, and tapes.

The data transfer device 5 can be realized by interfaces with respect to various types of communication means such as an ATM interface and an Ethernet interface.

The stream scheduling apparatus 2 further comprises a connection request processing unit 21, a reference schedule management unit 22 connected with the connection request processing unit 21 and having a reference schedule information 31, a schedule update unit 23 connected with the connection request processing unit 21, a schedule management unit 24 connected with the connection request processing unit 21 and the schedule update unit 23 and having a schedule information 32, a data access control unit 25 connected with the schedule management unit 24 and the data memory device 3, and a data transfer control unit 26 connected with the schedule management unit 24 and the data transfer device 5.

The reference schedule management unit 22 manages a schedule (the reference schedule information 31) of operations necessary in guaranteeing the continuity of each stream. The reference schedule can be managed in terms of (reference) time-slots, for example.

On the other hand, the schedule management unit 24 manages a schedule (the schedule information 32) of operations to be actually executed. The schedule management unit 24 actually manages timings for operations such as a reading of data from the data memory device 3 and a data transfer to the data transfer device 5 in terms of time-slots, for example.

Now, the time-slot management scheme for each stream in this first embodiment will be described. In this first embodiment, instead of fixing the disk access of each stream to a particular time-slot as in a conventional case, the disk access is allocated by tolerating a displacement within a range of a certain number of time-slots from the reference time-slot. This tolerable range for the displacement is set up to be such a range that the continuity of the transfer of the real time stream data to the client will not be broken by displacing the disk access over the time-slots within this range. In the following, this displacement of the disk access will be called a jitter, and a range of time-slots for which the allocation of the disk access of a stream is tolerated will be called a tolerable jitter range of that stream.

In this first embodiment, a time-slot from which the disk access cannot be displaced to any later time, that is a last end of the tolerable jitter range, is set to be a time-slot identical to the reference time-slot. Also, the timing for transfer is set to be two time-slots behind on a time axis of the reference time-slot.

Here, however, the reference time-slot may not necessarily be set at the last end of the tolerable jitter range, and may be set at the top or near the center of the tolerable jitter range, if desired. In short, it suffices for the reference time-slot to be a time-slot which becomes a reference for the purpose of defining in relative times, by what time the reading must be carried out at the latest, from what time the reading is possible at the earliest, and by what time the transfer must be carried out, in order to guarantee the continuity of the stream at the client side.

In a case where the reference time-slot is set at the last end of the tolerable jitter range, the time-slot for carrying out the disk access is chosen from those time-slots which are positioned ahead on a time axis of the reference time-slot, whereas in a case where the reference time-slot is set near the center of the tolerable jitter range, the time-slot for carrying out the disk access is chosen from those time-slots which are positioned ahead or behind on time axis of the reference time-slot, and in a case where the reference time-slot is set at the top of the tolerable jitter range, the time-slot for carrying out the disk access is chosen from those time-slots which are positioned behind on time axis of the reference time-slot.

Figure 6:
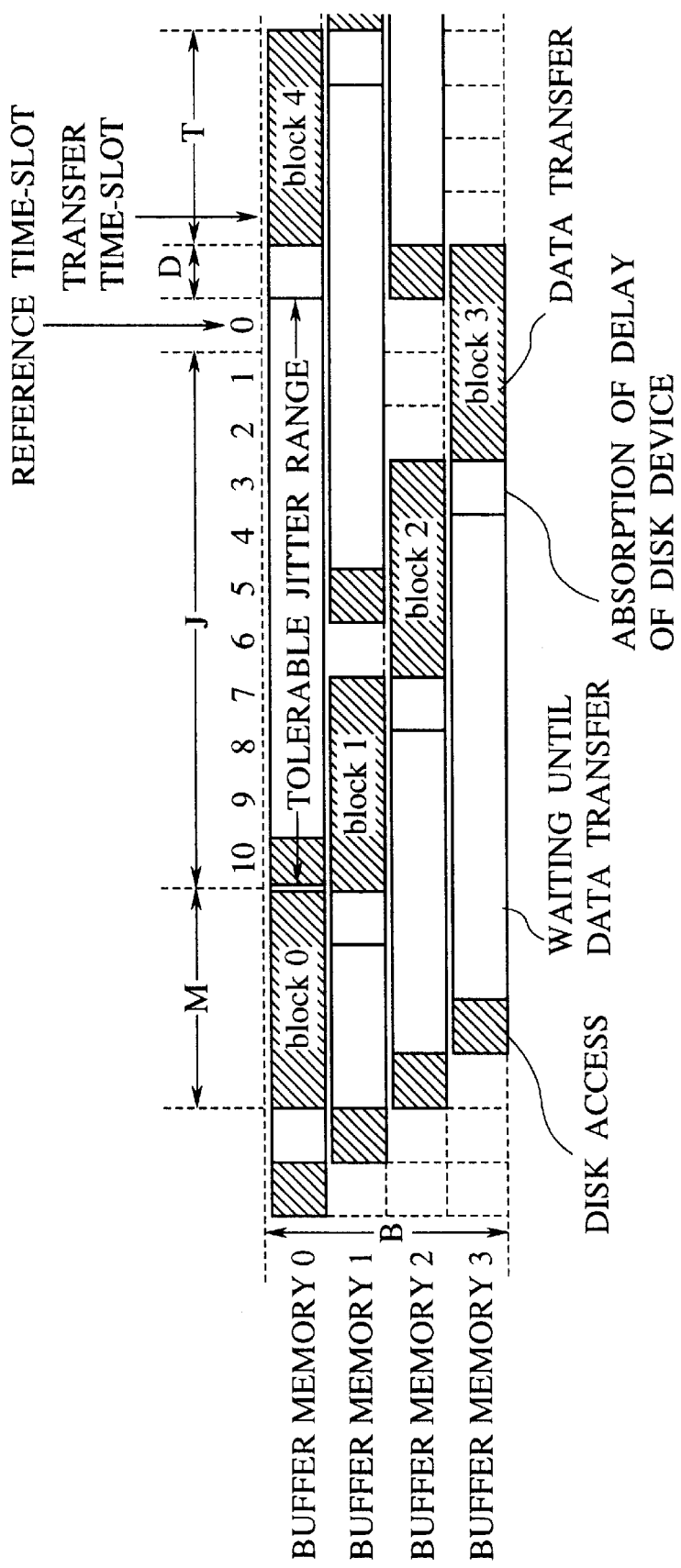
FIG. 6 is a timing chart showing one exemplary buffer memory utilization state and a corresponding tolerable jitter range for the real time stream server of FIG. 5.
Figure 7:
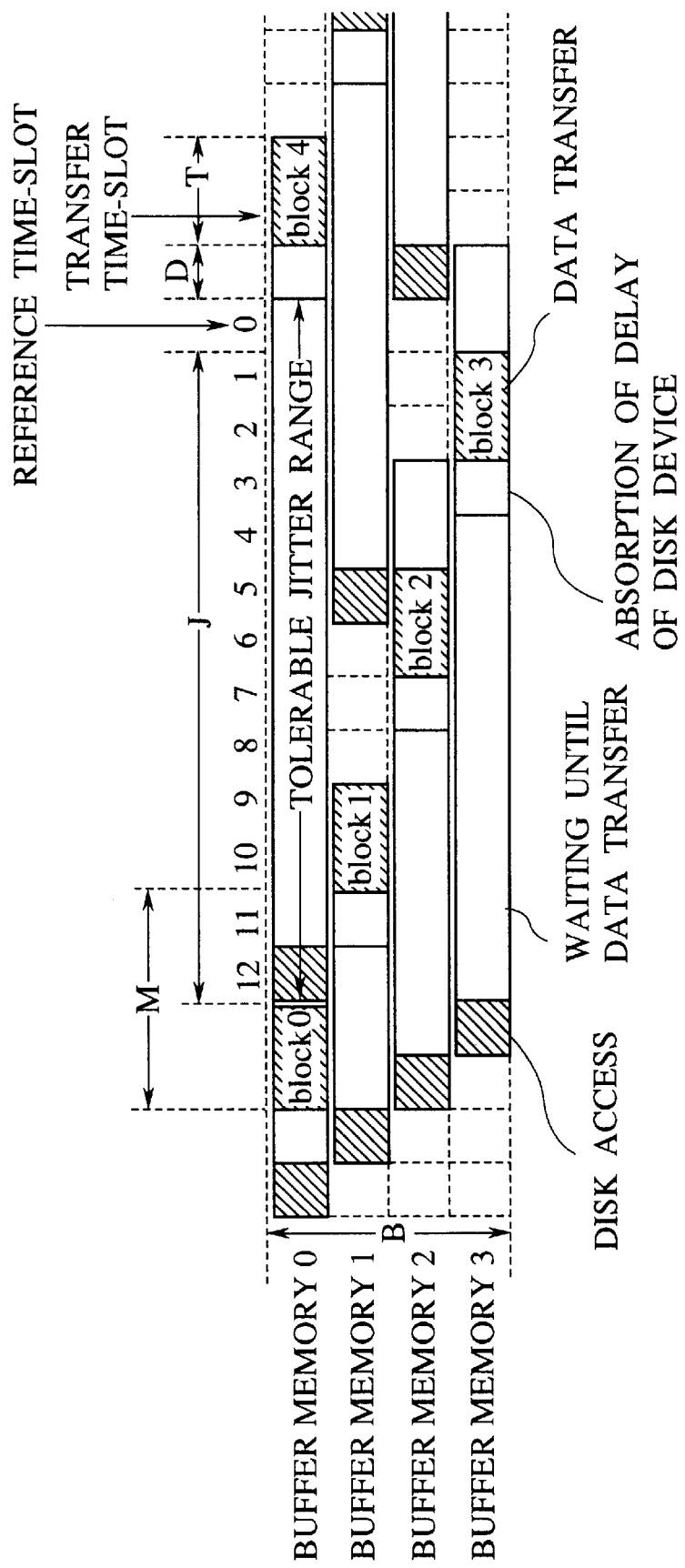
FIG. 7 is a timing chart showing another exemplary buffer memory utilization state and a corresponding tolerable jitter range for the real time stream server of FIG. 5.

Here, the tolerable jitter range is set up as shown in FIG. 6 and FIG. 7, and consequently, the maximum jitter number J can be determined by the following equation (1).

$$J \leq BM - D - T - 1 \qquad (1)$$

where B is a ratio of a size of a buffer memory that can be used by one stream and a size of one block of the real time stream data, M is a reproduction time (a number of slots) for one block at the client, T is a transfer time (a number of slots) for one block at the client, and D is an estimated maximum delay time (a number of slots) in a case where the disk access end time exceeds the end time of the allocated time-slot.

In an example shown in FIG. 6, both of a time required for the transfer of one block and a time required for the reproduction of one block at the client side are set to be four time-slots.

It is also possible to carry out the transfer of the block by the time shorter than the time required for the reproduction of the block by providing a buffer memory on the client side. For example, in an example shown in FIG. 7, a case where the client has a buffer memory capable of storing two or more blocks is shown. In this case, the data transferred in two slots time are reproduced in four slots time.

When a connection request for a stream is received from the client 7 via the communication network 6, the connection request processing unit 21 selects one reference schedule which can guarantee the continuity of the stream, and which can schedule the transfer start within a prescribed time limit, and registers this reference schedule in the reference schedule management unit 22, while also registering a schedule of actual operations which can satisfy the reference schedule managed by the reference schedule management unit 22 in the schedule management unit 24.

At this point, it is preferable for the connection request processing unit 21 to select the reference schedule for the stream such that a timewise concentration level of the reference schedules managed by the reference schedule management unit 22 becomes low. To this end, it suffices to set up an evaluation function indicating the concentration level of the reference time-slots at each time-slot, and selects the reference time-slot for a new stream according to the value of this evaluation function and the specified time limit, at the stream scheduling apparatus 2, for example. A concrete example of such an evaluation function will be described below.

It is also possible to include a remaining time of each stream in parameters of the above noted evaluation function. A concrete example of such an evaluation function will also be described below.

Note that the connection request processing unit 21 may be allowed to change the time limit depending on the length of the real time stream data of the stream. Also, the connection request processing unit 21 may be allowed to change the time limit depending on the access scheme (a type of an attribute of the connection request) of the stream.

The data access control unit 25 commands an operation to read out the stored real time stream data to the buffer memory device 4, with respect to the data memory device 3, according to the schedule managed by the schedule management unit 24.

The data transfer control unit 26 commands an operation to transfer the real time stream data read out to the buffer memory device 4 to the client 7 via the communication network 6, with respect to the data transfer device 5, according to the schedule managed by the schedule management unit 24.

Here, it is preferable to provide the schedule update unit 23 within the stream scheduling apparatus 2, as in a configuration of FIG. 5. This schedule update unit 23 changes the schedule managed by the schedule management unit 24 in a range satisfying the reference schedule for each stream managed by the reference schedule management unit 22. In other words, this schedule update unit 23 provides means for moving the disk access allocated to a certain time-slot to another time-slot within the tolerable jitter range. Here, the direction for moving the disk access includes two types of timewise forward and backward, and the moving procedures for the respective directions are provided. By utilizing these forward moving and backward moving procedures, it is possible to allocate the disk access of a new stream by releasing the time-slot within the selected tolerable jitter range.

Note that it is also possible to use a configuration which does not have the schedule update unit 23, if desired.

Next, the outline of the operation in this first embodiment will be described.

In the stream scheduling apparatus 2 of the real time stream server 1 in this first invention, when the connection request for a new stream arrives from the client 7, the connection request processing unit 21 of the stream scheduling apparatus 2 selects the reference schedule for that stream which is represented by the reference time-slot. At this point, the reference time-slot for a new stream is selected such that the reference time-slots for all the streams will be dispersed as much as possible on a time axis after the connection is made, as described above. Here, however, the reference time-slot is selected in a range in which the response time does not exceed the specified time limit.

For the sake of this selection operation, the evaluation function indicating the concentration level of the reference time-slots at each time-slot is set up, and a value of this concentration level evaluation function is calculated for each time-slot in a range in which the response time does not exceed the specified time limit when this time-slot is selected as the reference time-slot. The time-slots are then sorted by the calculated values, and sequentially selected as a candidate for the reference time-slot in an increasing order of the calculated concentration levels. In a case where the reference time-slot to which the allocation is possible does not exist in a range in which the response time does not exceed the specified time limit, those time-slots starting from the time-slot immediately behind of that range are sequentially selected as a candidate for the reference time-slot.

Next, among the time-slots managed by the schedule management unit 24, the disk access of a new stream is allocated to an arbitrary time-slot within the selected tolerable jitter range, and in a case where the disk access of another stream is already allocated to this time-slot, the disk access of a new stream is allocated after this time-slot is vacated by executing the forward moving procedure or the backward moving procedure for the disk access of another stream. Here, however, in a case where the moving of the disk access of another stream is impossible in either direction, the allocation of the disk access of a new stream to this time-slot is impossible, so that the similar processing is carried out for another time-slot within the selected tolerable jitter range. In a case where it is impossible to allocate the disk access to any time-slot within the selected tolerable jitter range, the reference time-slot and the tolerable jitter range are selected again.

In this manner, even in a case where a vacant time-slot does not exist within the specified time limit, by vacating the time-slot by moving the disk access of another stream, the probability for being able to make a response within the specified time limit can be increased.

It is also possible in this first embodiment to use the following operation, which is different from the above described operation. Namely, at a time of the connection request arrival, a vacant time-slot is searched sequentially from the time-slot next to the currently reading time-slot. At this point, for each already allocated time-slot, whether it is possible to vacate this time-slot by executing the forward moving procedure or the backward moving procedure similarly as in the above described operation or not is checked. When a vacant time-slot or a time-slot which can be vacated is found, the disk access of a new stream is allocated to that time-slot.

After that, every such time-slot for which, when this time-slot is selected as the reference time-slot, the time-slot allocated with the disk access will be contained within the tolerable jitter range, is extracted. In a case where the extracted time-slots include those time-slots for which it becomes possible to make a response within the specified time limit when any of these time-slots is selected as the reference time-slot, the time-slot for which the concentration level is the lowest among these time-slots is set as the reference time-slot. In a case where the time-slot for which it becomes possible to make a response within the specified limit time does not exist, the time-slot for which the response time is the shortest among the extracted time-slots is set as the reference time-slot.

In a case of the forward moving, the disk access cannot be moved to ahead of a top time-slot for the disk device in which the blocks to be read out are stored (i.e., a time-slot pointed by a current head), even if it is within the tolerable jitter range. As described above, at a time of connecting a new stream, the time-slot close to the top time-slot (head) will be selected, so that the probability for success is higher for the backward moving than the forward moving. However, when the disk access which is delayed by the backward moving is left as delayed, the probability for being impossible to move backward any further becomes high. For this reason, the schedule update unit 23 is operated to refer to the schedule managed by the schedule management unit 24, and constantly carry out the processing to pull back each disk access forward, even at a time other than that at which a new connection request is made. By means of this forward pull back procedure, it is possible to increase the probability for being possible to move backward.

Figure 8:
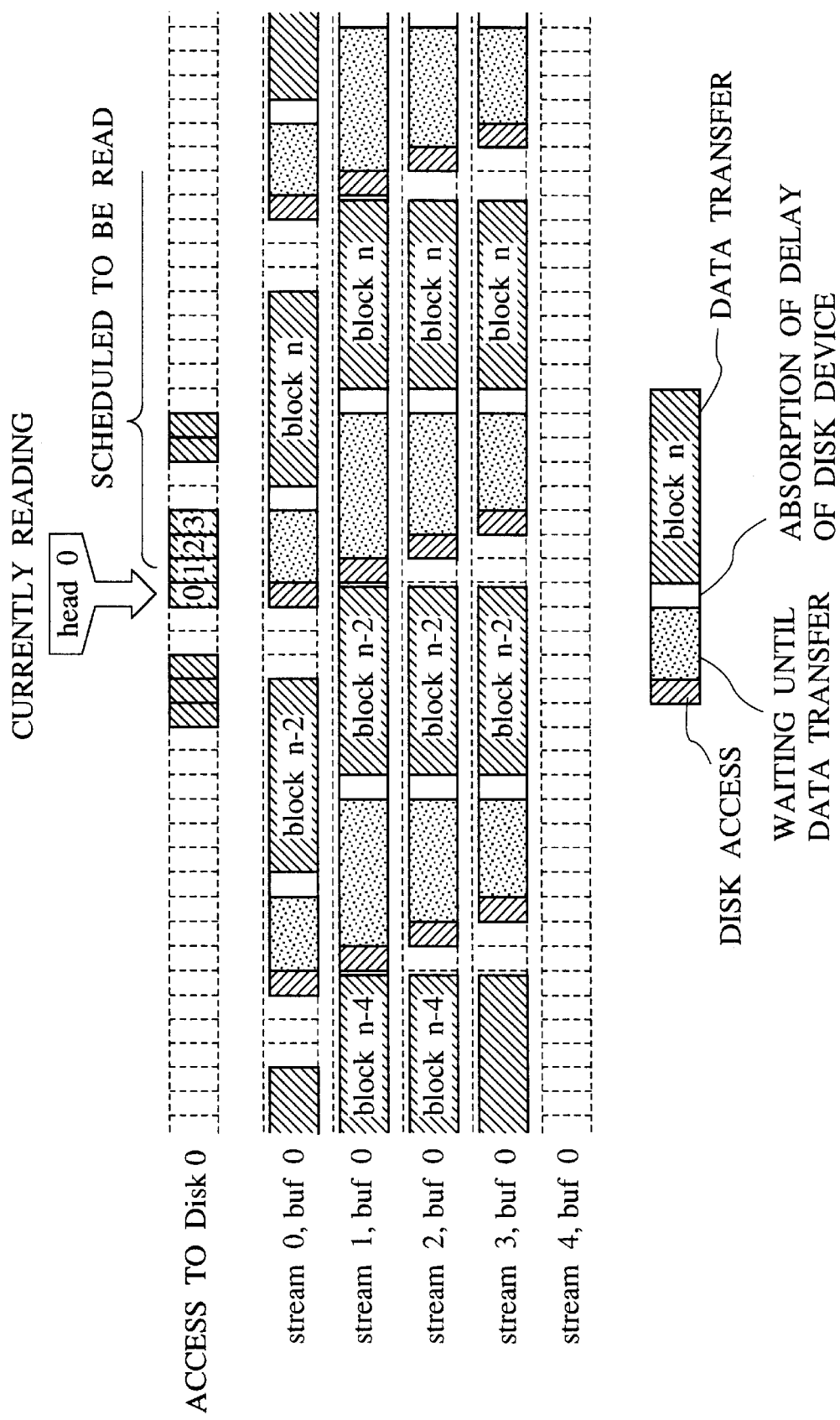
FIG. 8 is a timing chart showing one exemplary state at a time of the connection request processing in the real time stream server of FIG. 5.
Figure 9:
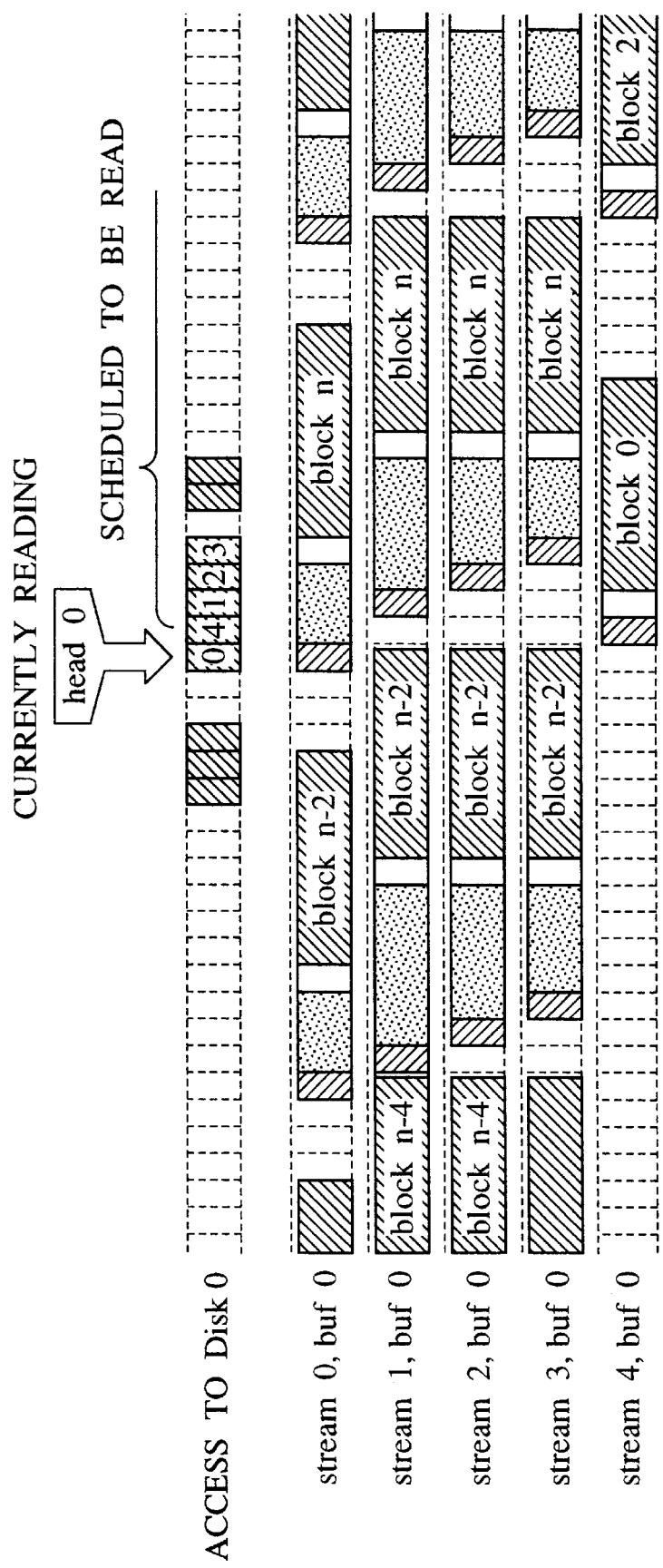
FIG. 9 is a timing chart showing one exemplary state after the connection request processing is applied to the state of FIG. 8 in the real time stream server of FIG. 5.

Here, with references to FIG. 8 and FIG. 9, a concrete example of the connection request processing in this first embodiment will be described. FIG. 8 shows a state at a time of the connection request for a stream 4, and FIG. 9 shows a state after the connection of the stream 4. Note that the explanation of each area with a distinct hatching given in FIG. 8 also applies to FIG. 9. Both FIG. 8 and FIG. 9 show a timing chart for accesses to a disk 0 and a use of a buffer 0 for each stream, in the real time stream server represented by parameters of M=T=8, B=2, and D=1. Also, it is assumed here that the 0-th block and the n-th block are stored in the disk 0. Even when a vacant time-slot exists only at four slots behind of the time-slot currently reading the disk 0 at a time of the connection request for the stream 4 as shown in FIG. 8, by moving the disk access to another time-slot within the tolerable jitter range of each stream as shown in FIG. 9, it becomes possible to allocate the disk access of a new stream to the time-slot for which the waiting time is the shortest.

Figure 10:
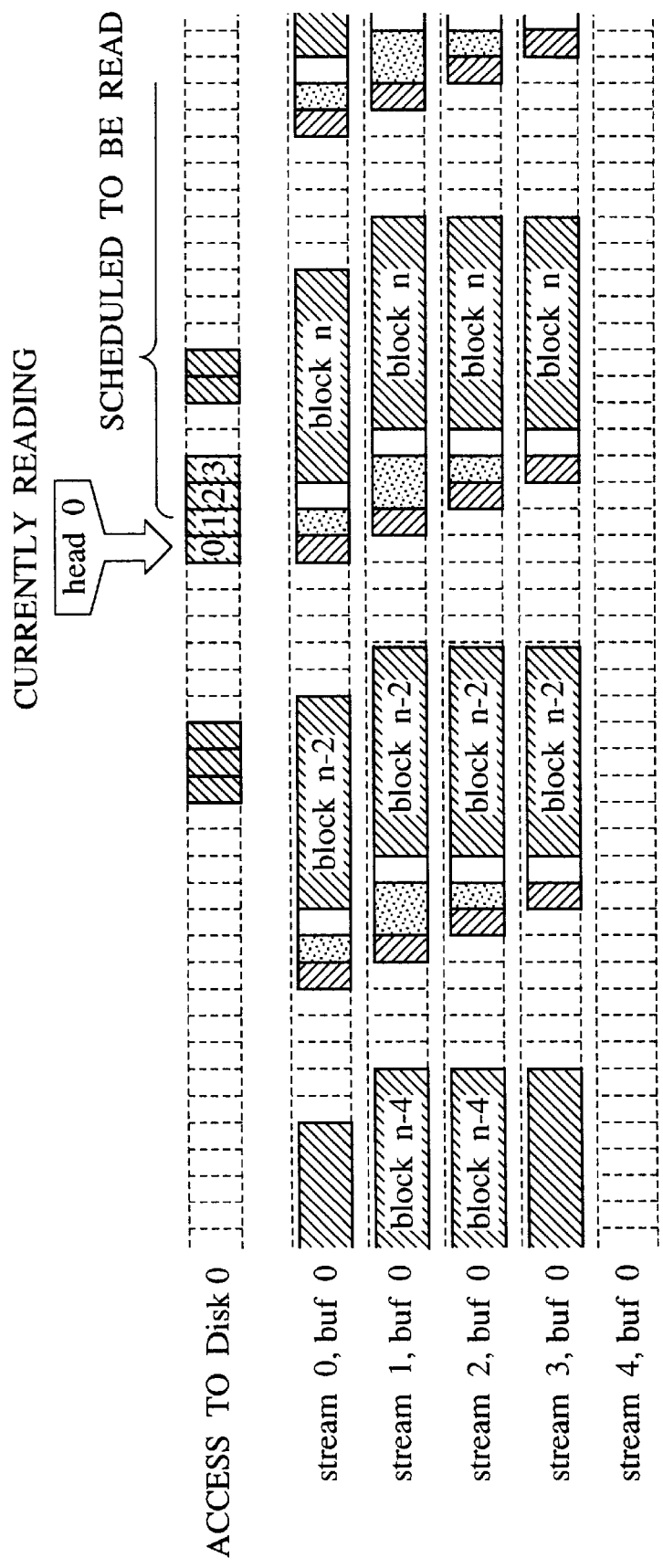
FIG. 10 is a timing chart showing another exemplary state at a time of the connection request processing in the real time stream server of FIG. 5.
Figure 11:
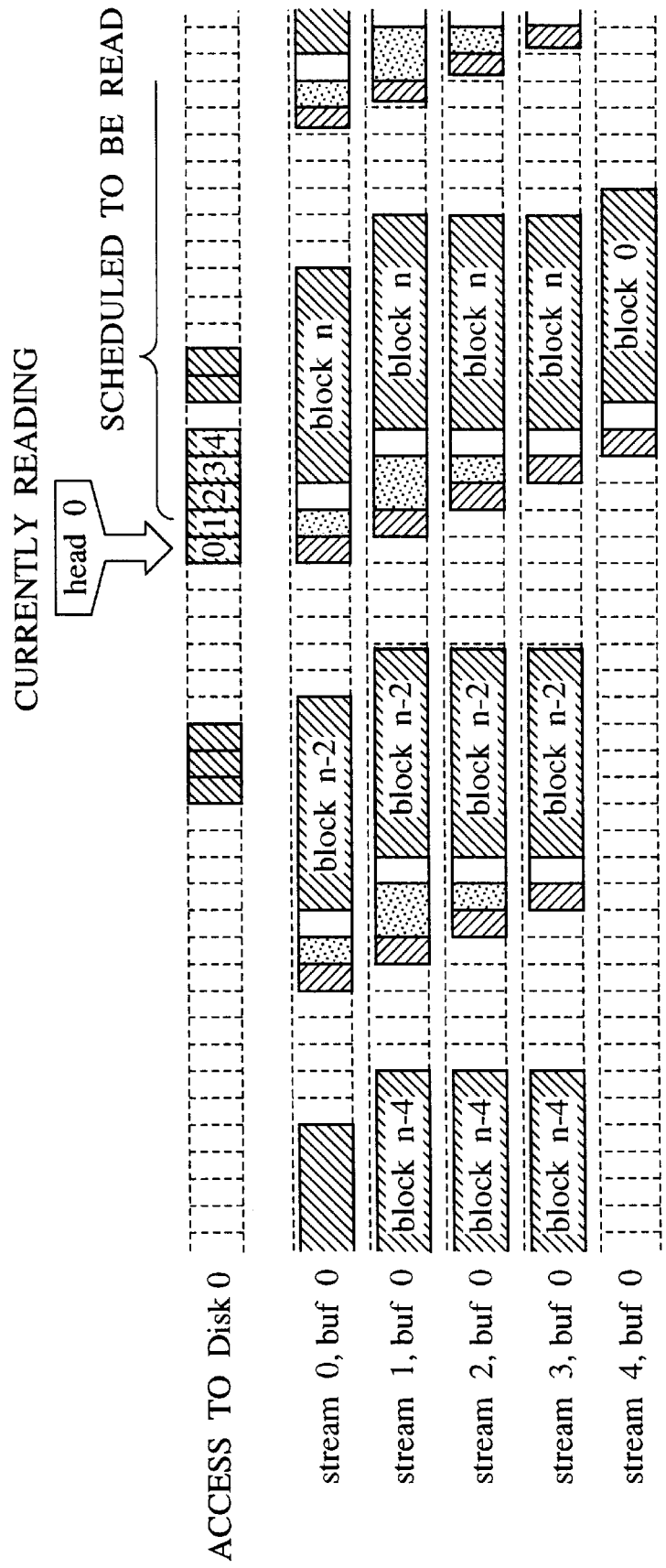
FIG. 11 is a timing chart showing another exemplary state after the connection request processing is applied to the state of FIG. 10 in the real time stream server of FIG. 5.

Also, FIG. 10 and FIG. 11 show another concrete example of the connection request processing in this first embodiment. FIG. 10 shows a state at a time of the connection request for a stream 4, and FIG. 11 shows a state after the connection of the stream 4. Note that the explanation of each area with a distinct hatching given in FIG. 8 also applies to these FIG. 10 and FIG. 11. In an example of FIG. 8 and FIG. 9, it was possible to vacate the time-slot, but it is not necessarily always possible to vacate the specified time-slot. In a case of FIG. 10, the disk accesses of streams 0 to 3 are allocated to the time-slots close to the reference time-slot within the tolerable jitter range, so that it is impossible to move these disk accesses to other time-slots. Consequently, it cannot be helped to allocate the disk access of the stream 4 to the time-slot subsequent to these already allocated time-slots as shown in FIG. 11.

Figure 12:
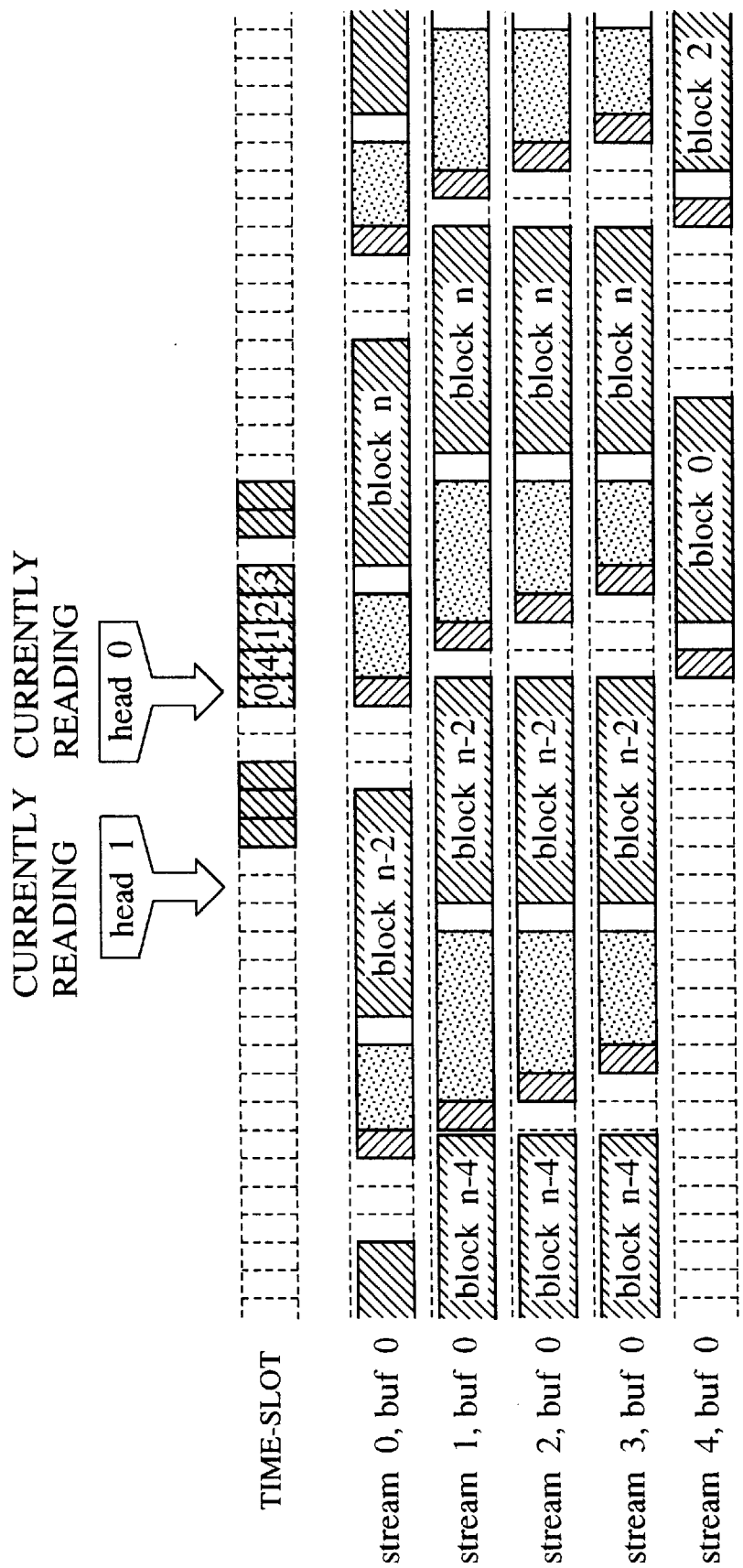
FIG. 12 is a timing chart showing one exemplary state at a time of the forward pull back processing in the real time stream server of FIG. 5.
Figure 13:
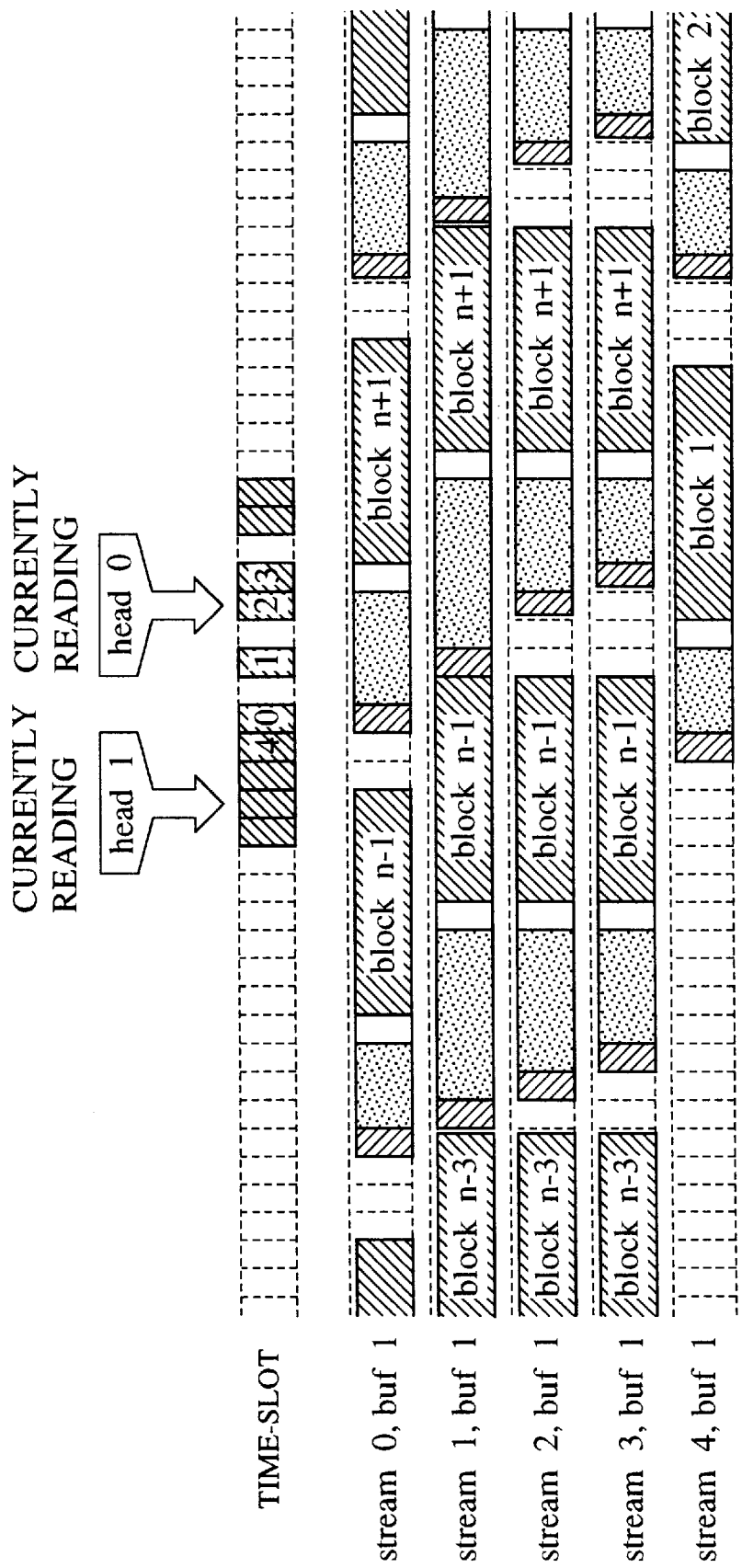
FIG. 13 is a timing chart showing one exemplary state after the forward pull back processing is applied to the state of FIG. 12 in the real time stream server of FIG. 5.

On the other hand. FIG. 12 and FIG. 13 show a concrete example of the forward pull back procedure for the disk access, for the purpose of avoiding the situation shown in FIG. 10 and FIG. 11 as much as possible. Note that the explanation of each area with a distinct hatching given in FIG. 8 also applies to these FIG. 12 and FIG. 13. FIG. 12 shows a state of the time-slot at some point along a timing chart for a use of a buffer 0, with a position of a head 0 as a reference. FIG. 13 shows a state of the time-slots at three slots time after FIG. 12, and a timing chart for a use of a buffer 1, with a position of a head 1 as a reference (so that the time in the timing chart for a use of a buffer is different in FIG. 12 and FIG. 13). In FIG. 13, the respective disk accesses of the streams 4, 0 and 1 which executed accesses to the disk 0 are pulled back forward to the time-slots within the tolerable jitter range and behind of the head 1.

Referring now to FIG. 14 to FIG. 24, the second embodiment of a stream scheduling apparatus for a real time stream server according to the present invention will be described in detail. This second embodiment is a more concrete embodiment based on the first embodiment described above.

Figure 14:
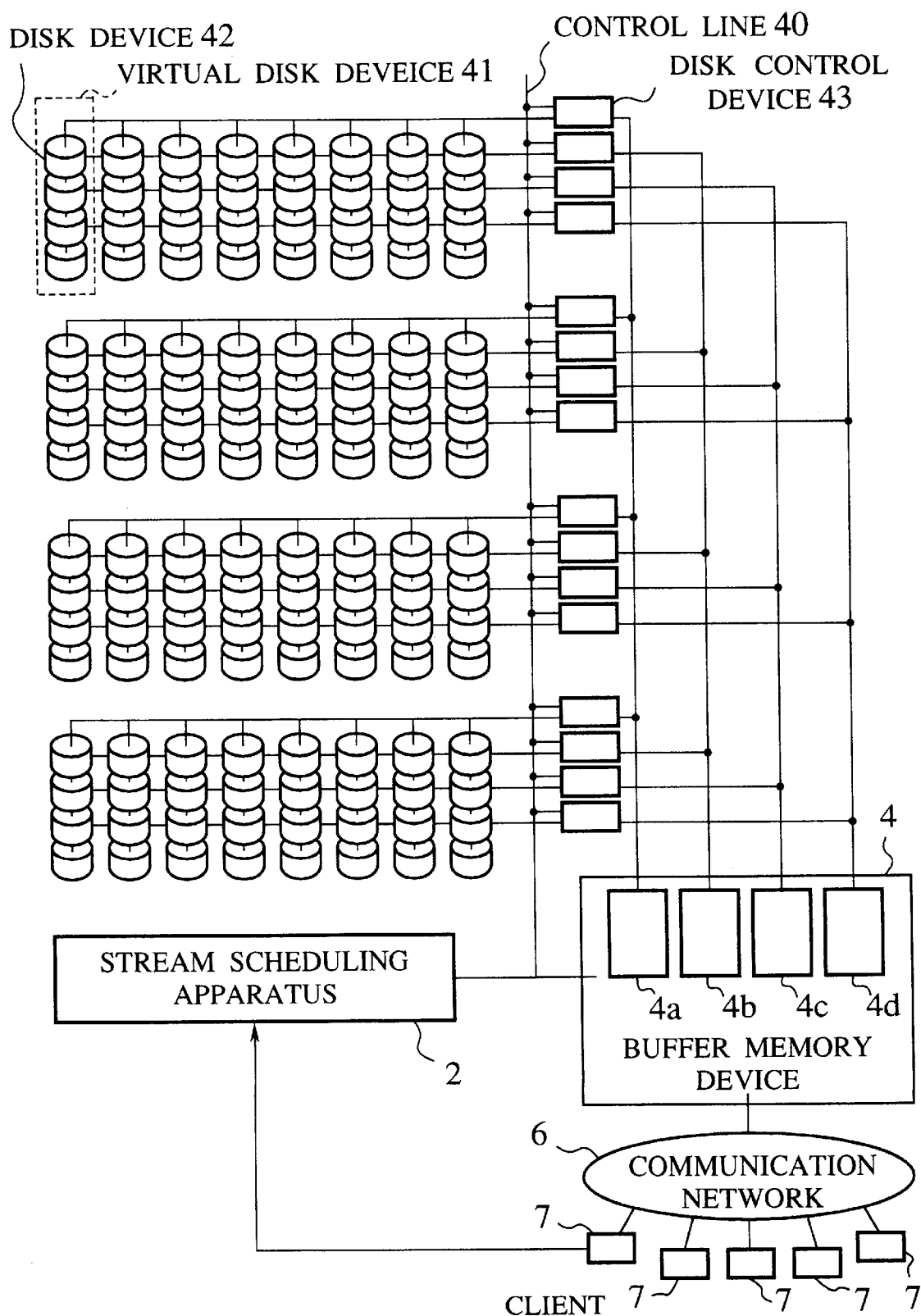
FIG. 14 is a block diagram of a second embodiment of a real time stream server using a stream scheduling apparatus according to the present invention.

In this second embodiment, an exemplary case of the real time stream server for which the maximum number of connectable streams is 256 will be described. This real time stream server has an exemplary overall configuration as shown in FIG. 14, where the stream scheduling apparatus 2 has a similar internal configuration as that shown in FIG. 5. The configuration of FIG. 14 also includes a section corresponding to the data memory device 3 of FIG. 5, which includes: a number of disk devices 42 for storing the real time stream data, a plurality of disk control devices 43 for reading out data from the disk devices 42 which are connected with the stream scheduling apparatus 2 via a control line 40. In FIG. 14, a section corresponding to the data transfer device 5 of FIG. 14 is omitted. Also, in FIG. 14, the buffer memory device 4 contains four buffer memories 4a, 4b, 4c and 4d which are connected with the disk control devices 43.

Here, it is assumed that the reproduction bit rate Vb of the stream data is 1 MBps, and one block is formed by data for one second of the reproduction time. Consequently, a size of one block becomes 1 MB. Also, the transfer bit rate Db of the disk device 42 used here is assumed to be 2 MBps. Then, 128 sets of disk devices 42 will be necessary. In addition, in order to shorten the slot time, four sets of disk devices 42 are regarded as a single virtual disk device 41, and one block is divided into four and striped over four disk devices 42 forming a single virtual disk device 41. Consequently, it is possible to regard that one block will be read out at each one time-slot from each of 32 sets of virtual disk devices 41 (a number of heads on a slot ring is equal to a number of virtual disk devices 41 which is 32), so that the disk access period for one stream will be 256/32=8 (time-slots) and one slot time will be ⅛ (second/time-slot). Assuming that the buffer memory of the buffer memory device 4 that can be used by each stream is a double buffer, the total 512 MB will be necessary for the buffer memory device 4.

Assuming that the data transfer bit rate Tb from each of the buffer memories 4a to 4c to the client 7 is 1 MBps and the maximum delay time of the disk access is one slot time, the maximum jitter number J will be given by:

$$J \leq 2 \times 8 - 1 - (2 \times 4/1) - 1 = 6$$

according to the equation (1) described above.

With this configuration, the stream scheduling apparatus 2 carries out the following processing in one slot time, according to the flow chart of FIG. 15.

1. The connection request processing (step S1);
2. The forward pull back processing for the disk access (step S2) and the updating of heads (step S3);
3. The issuing of the command for reading from the disk device to the buffer memory (step S7); and
4. The issuing of the command for data transfer from the buffer memory to the client (step S11).

Here, one example of the slot ring used in this second embodiment is shown in FIG. 16A. Namely, in this second embodiment, in order to guarantee the continuity of the stream, the slot ring in which as many time-slots as the number of connectable streams are arranged on a circle as shown in 16A is provided, and the periodic operations of the disk access and the transfer to the client are managed using this slot ring of FIG. 16A. On the slot ring, heads corresponding to the respective disk devices are arranged, with as much mutual interval as the disk access period, in an opposite order of the striping number.

Also, examples of a time-slot structure, a stream structure, a disk access structure and a data transfer structure to be used in conjunction with the slot ring of FIG. 16A are shown in FIG. 16B, 16C, 16D and 16E, respectively. As shown in 16B, the time-slot structure contains a disk access structure ID and a plurality of data transfer structure IDs. As shown in 16C, the stream structure for each stream contains a disk access structure ID and a data transfer structure ID, i.e., parameters related to the disk access and the data transfer from the buffer. As shown in FIG. 16D, the disk access structure contains a current head number for a head (current head) corresponding to the disk device which stores a current block, a current block number for a block (current block) to be read out from the disk next, a stream structure ID, a buffer memory address, the reference time-slot, and the tolerable jitter range. As shown in FIG. 16E, the data transfer structure contains, a transfer current head number for a head (transfer current head) corresponding to the disk device which stores a transfer current block, a transfer current block number for a block (transfer current block) to be transferred from the buffer next, a buffer memory address, and a client ID.

Note that it is impossible to allocate a plurality of disk accesses to the same time-slot, but it is permitted for a plurality of streams to set the same time-slot as the reference time-slot. Similarly, it is also permitted for a plurality of streams to set the same time-slot as the transfer time-slot.

Now, each head on the slot ring of FIG. 16A moves to the next time-slot in each one slot time, and as a result, circles around the slot ring once in an access period for a prescribed disk.

Using this slot ring of FIG. 16A, the operation according to the flow chart of FIG. 15 is carried out as follows.

First, the connection request processing (step S1) is carried out, and the forward pull back processing for the disk access (step S2) is carried out. Then, after all the heads are moved to the respective next time-slots (step S3), the following processing (1) and (2) are repeatedly carried out for the time-slot TSi pointed by each head i (step S4).

(1) In a case where the disk access is allocated to the time-slot TSi pointed by the head i after the moving (step S5 True), and the head number of the head i coincides with the current head number in the disk access structure for the allocated disk access (step S6 True), the disk access command is issued so as to execute this disk access (step S7). Then, the current block number and the current head number in that disk access structure are updated (step S8). The steps S6 to S8 are skipped if the step S5 is False, and the steps S7 to S8 are skipped if the step S6 is False.

(2) For every data transfer structure allocated to the time-slot TSi pointed by the head i after moving, the following steps are repeatedly carried out (step S9). Namely, in a case where the data transfer is allocated to the time-slot TSi and the head number of the head i coincides with the transfer current head number for the allocated data transfer (step S10 True), the data transfer command is issued so as to execute this data transfer (step S11). Then, the transfer current block number and the transfer current head number in that data transfer structure are updated (step S12). The steps S11 to S12 are skipped if the step S10 is False.

It is to be noted that there is a certain level of dispersion in turnaround times of the disk devices due to such a cause as a difference in seek distances, so that there is a possibility for the disk access end time to exceed the end time of the time-slot to which this disk access is allocated. For this reason, in order to guarantee the continuity of each stream, it is preferable to set up the transfer time-slot by providing a time for absorbing the delay of the disk access immediately after the reference time-slot. In this second embodiment, the waiting time of 0.125 second, that is one slot time, is inserted between the reference time-slot and the transfer time-slot, just as in the first embodiment described above (see FIG. 6 to FIG. 13 of the first embodiment).

It is also to be noted that, in order to absorb the dispersion of the network delay between the server and the client, it is also preferable to carry out the transfer of the second and subsequent blocks one slot time earlier. To be concrete, after the transfer of one block, the transfer time-slot is set up again to the time-slot at one slot ahead. In this case, to the client side, a buffer memory capable of storing two blocks simultaneously (that is, a double buffer) is to be provided.

Next, the connection request processing in this second embodiment will be described with references to FIG. 17 to FIG. 21. In this second embodiment, the connection request processing is carried out according to the flow chart of FIG. 17 as follows.

When the connection request arrives from the client 7, this request is entered into the queue once. The stream scheduling apparatus 2 takes out the request within the queue at a start of the next time-slot, and repeatedly carried out the following processing with respect to every connection request in the queue (step S21).

The stream scheduling apparatus 2 produces a list in which the time-slots are arranged in an increasing order of response time when each time-slot is set as the reference time-slot (step S22), and obtains a set STSset of those time-slots STS among all the time-slots for which the time since the connection request arrival time until the transfer start time for the first block does not exceed the specified time limit when each time-slot is selected as the reference time-slot for a new stream (step S23). Then, the stream scheduling apparatus 2 calculates the concentration level Ci of the reference time-slots for every element STSi of the set STSset (step S24), and rearranges the elements STSi of the set STSset in the list according to the calculated concentration levels Ci of the reference time-slots (step S25). Then, the rearranged time-slot in the list is sequentially set as a candidate for the reference time-slot, starting from the top time-slot of the list (step S26). In other words, the time-slot in the list is sequentially selected as the reference time-slot in an order of lower concentration level when it is possible to make a response within the specified time limit, and in an order of shorter response time when it is impossible to make a response within the specified time limit.

Here, the evaluation function f(x) indicating the concentration level of the reference time-slots at each time-slot is defined as follows.

$$f(x)=\Sigma(R-\text{distance }(x, d))^n \qquad (2)$$

where x is a time-slot, d is the reference time-slot for the currently connected stream, distance (x, d) is the shortest time-slot interval of x and d on the slot ring, R is a range for which a certain disk access affects a value of the concentration level, n is an integer greater than or equal to 1, and the summation is taken for $\{d \mid \text{distance }(x, d) \leq R\}$. When this range R is set equal to (the maximum number of streams)/2, all the time-slots will be affected by each disk access, whereas when this range R is set equal to 0, the scheduling will be made without using the concentration level. It is also possible to use any other function of (R−distance (x, d)) for this evaluation function f(x).

Here, it is also possible to change the time limit used in the above noted procedure according to the type of the connection request. For example, a long time limit can be set for the connection request requesting the replay of a movie, or a short time limit can be set for the connection request requesting the search through many stream data. It is also possible to set the shortest time limit for the connection request requesting the visual search (such as fast forward mode) of the data or the connection request requesting the high cost operation of the data.

Also, it is possible to change the affected range R of the concentration level evaluation function according to the remaining reproduction time of each stream. For the reference time-slot of the stream for which the remaining reproduction time is expected to be long, it is possible to expect the subsequent influence to the concentration level on the slot ring to last long, so that a value of the affected range R can be made larger. On the contrary, the affected range R for the stream for which the remaining reproduction time is expected to be short can be made smaller. Similarly, it is also possible to change a value of n in the above equation (2) such that the value of the concentration level evaluation function becomes large for a case in which the influence to the concentration level is expected to be large.

In this example, the parameters R and n of the concentration level evaluation function are set to be 128 and 2, respectively.

Next, for the reference time-slot candidate selected at the step S26, whether it is possible to allocate the disk access to a time-slot which is positioned within the tolerable jitter range determined by this reference time-slot candidate and behind of the current head is checked, in order to find out a time-slot to allocate the disk access (step S27).

Figure 18:
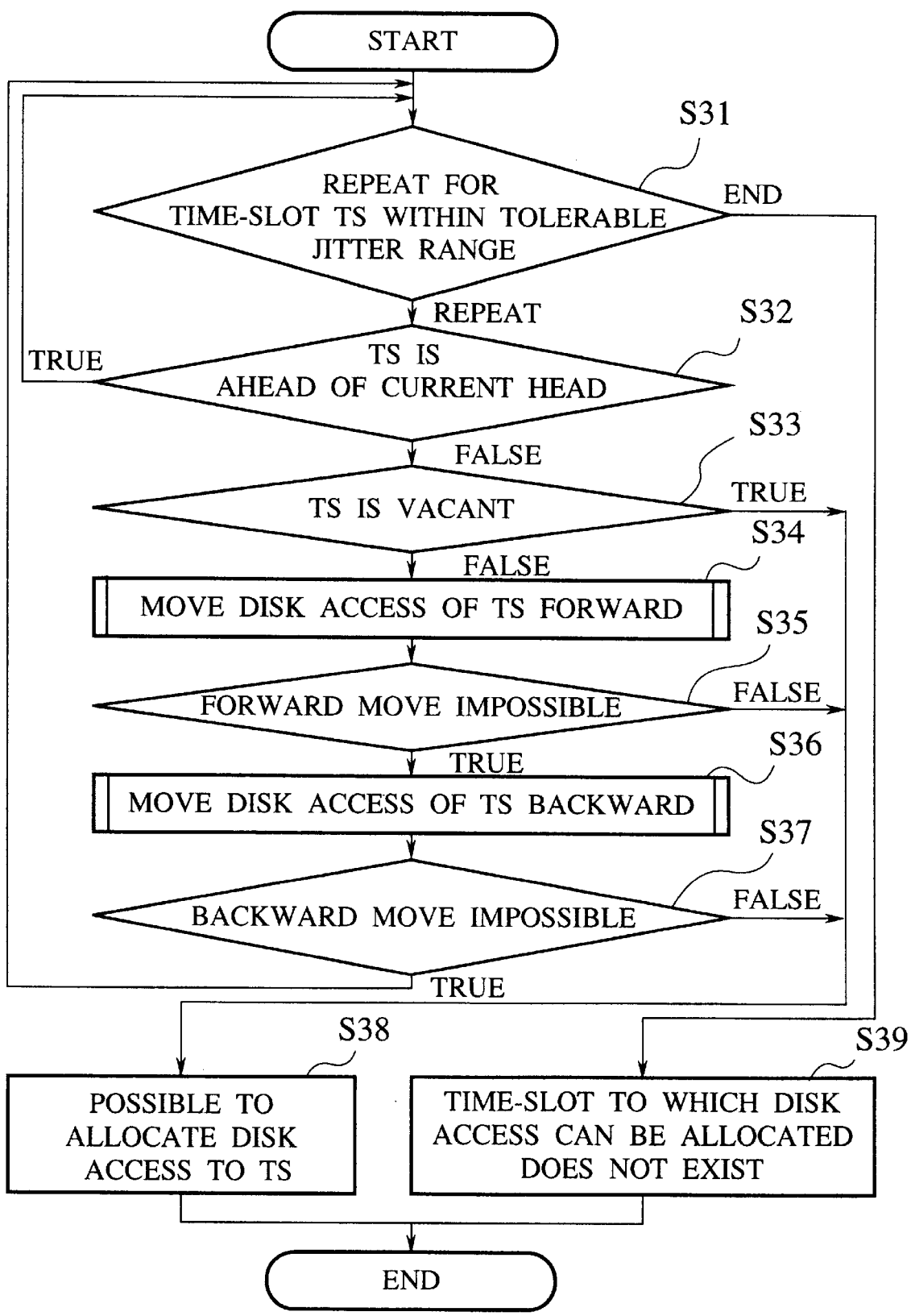
FIG. 18 is a flow chart for the processing to search out the time-slot to allocate the disk access in the connection request processing of FIG. 17.

At this point, the checking is carried out by selecting time-slots sequentially from a time-slot closer to the current head. The flow chart for this processing to search out the time-slot to allocate the disk access is shown in FIG. 18.

Namely, the following steps are repeatedly carried out for each selected time-slot TS within the tolerable jitter range (step S31). Whether the time-slot TS is ahead of the current head or not is checked (step S32). If so, the processing returns to the step S31 for the next time-slot, whereas if not, whether the time-slot TS is vacant or not is checked (step S33). In a case where the selected time-slot is a vacant time-slot (step S33 True), it can be judged that it is possible to allocate the disk access for a new stream to this time-slot TS (step S38).

When the time-slot TS is not a vacant time-slot (step S33 False), i.e., when another disk access is already allocated to the selected time-slot, the forward moving procedure is carried out with respect to that already allocated disk access (step S34). In a case where it is possible to move that already allocated disk access forward (step S35 False), it can be judged that it is possible to allocate the disk access for a new stream to this time-slot TS (step S38).

In a case where it is not possible to move that already allocated disk access forward (step S35 True), the backward moving procedure is carried out with respect to that already allocated disk access (step S36). In a case where it is possible to move that already allocated disk access backward (step S37 False), it can be judged that it is possible to allocate the disk access for a new stream to this time-slot TS (step S38).

In a case where it is not possible to move that already allocated disk access backward (step S37 True), i.e., in a case where it is not possible to move that already allocated disk access in either direction, it can be judged that it is impossible to allocate the disk access for a new stream to this time-slot TS (step S39), and it is necessary to select another time-slot.

Figure 17:
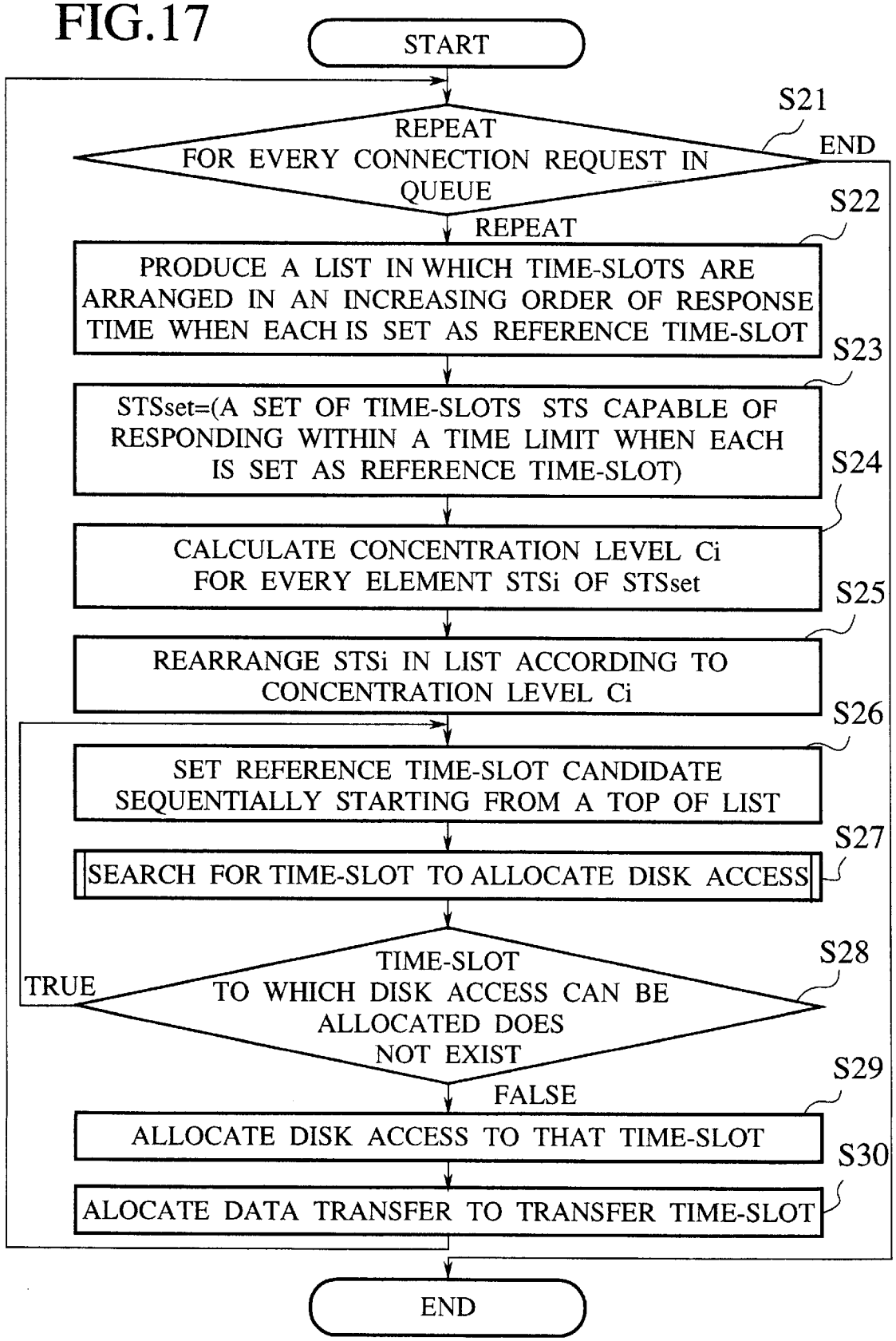
FIG. 17 is a flow chart for the connection request processing in the real time stream server of FIG. 14.

Returning to the flow chart of FIG. 17, if a time-slot to which the disk access for a new stream can be allocated is found by the processing of FIG. 18 (step S28 False), the disk access is allocated to that time-slot (step S29), and the data transfer is allocated to the transfer time-slot which is determined according to the reference time-slot (step S30).

On the other hand, if a time-slot to which the disk access for a new stream can be allocated does not exist according to the processing of FIG. 18 (step S28 True), i.e., in a case where the allocation of the disk access for a new stream is impossible at all the selectable time-slots, it is regarded that the scheduling by that reference time-slot candidate is impossible, and the possibility of disk access allocation using a next time-slot in the list as a reference time-slot candidate is checked by returning to the above described steps S26 and S27.

In order to move the disk access as in the above, it is necessary to find a moving destination time-slot. In a case where there exists a vacant time-slot to which the disk access can be moved within the tolerable jitter range, it suffices to move the disk access to that vacant time-slot. However, even in a case where a vacant time-slot does not exist, if it is possible to move another disk access allocated to a time-slot within the tolerable jitter range to outside the tolerable jitter range, it becomes possible to vacate that time-slot by moving that another disk access first.

Figure 19:
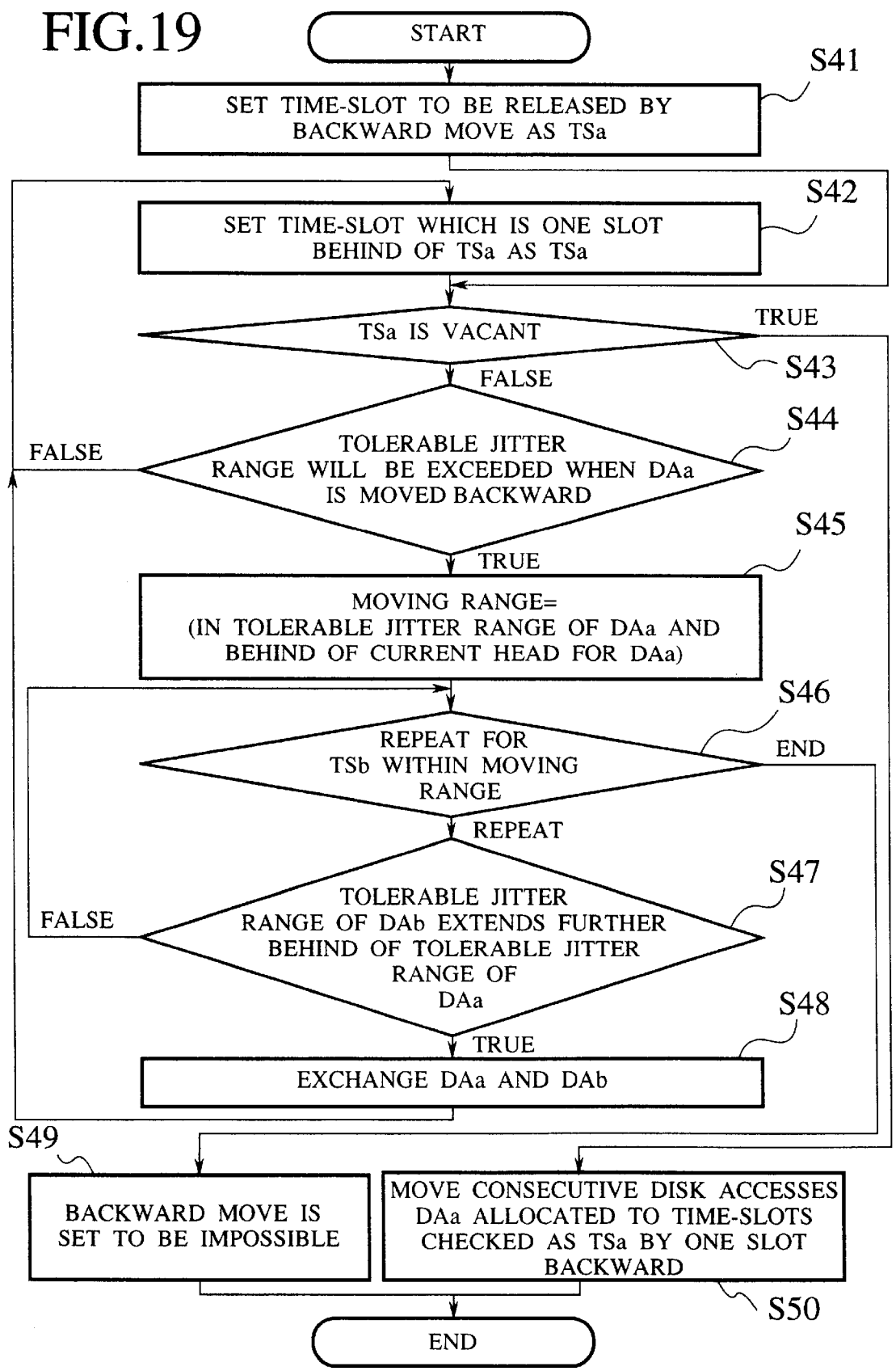
FIG. 19 is a flow chart for the backward moving procedure for disk access to be carried out in the processing of FIG. 18.
Figure 20:
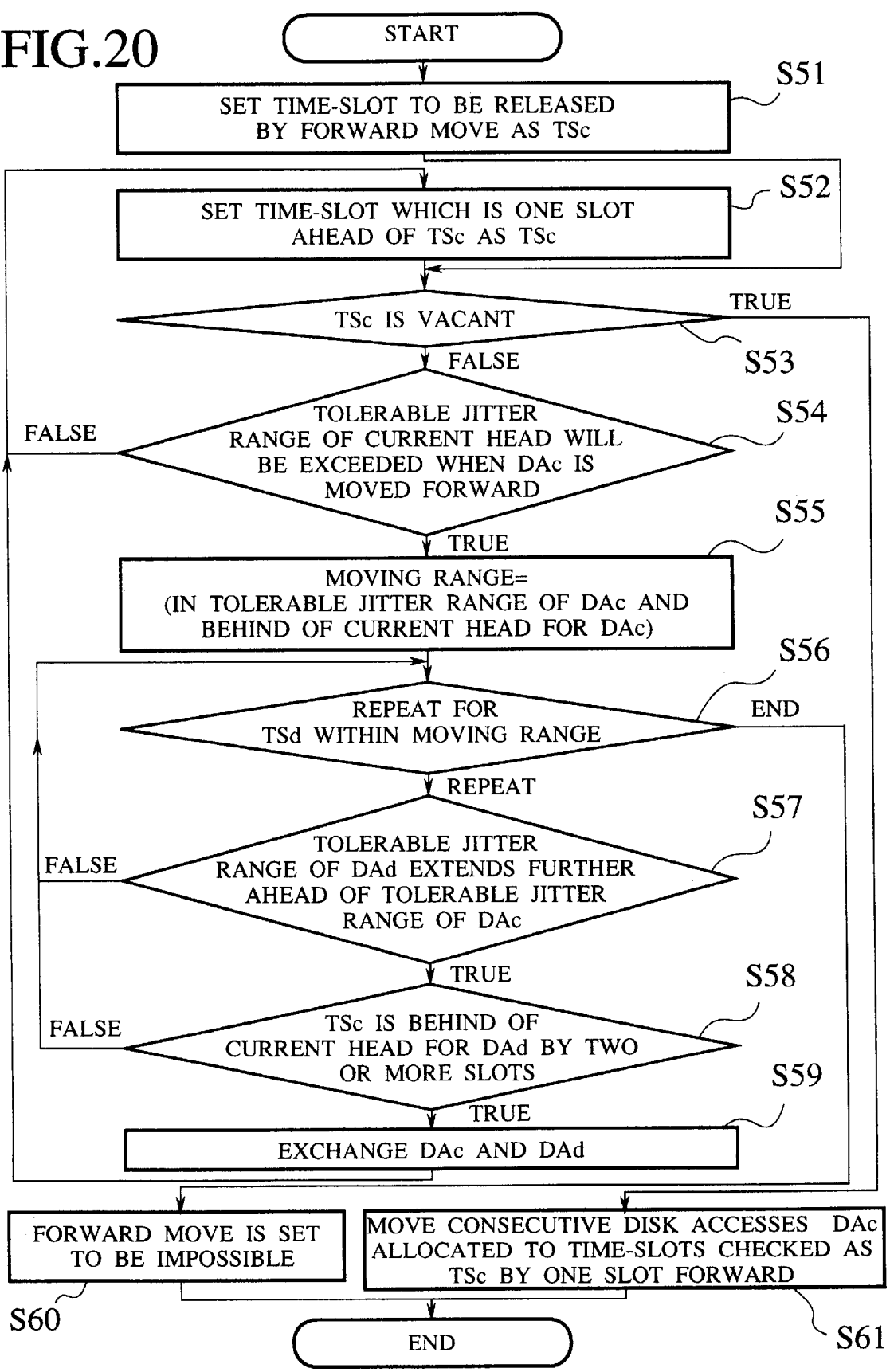
FIG. 20 is a flow chart for the forward moving procedure for disk access to be carried out in the processing of FIG. 18.

Next, the flow chart of the backward moving procedure to be carried out at the step S36 of FIG. 18 is shown in FIG. 19, and the flow chart of the forward moving procedure to be carried out at the step S34 of FIG. 18 is shown in FIG. 20.

In the backward moving procedure of FIG. 19, a method for displacing a group of consecutive disk accesses on the slot ring together backward by one time-slot is adopted.

First, the time-slot to be released by the backward moving is set as TSa (step S41), and a disk access allocated to this time-slot will be referred to as DAa. At first, this time-slot TSa is not vacant (step S43 False), so next, whether the tolerable jitter range of the disk access DAa will be exceeded when the disk access DAa is moved backward or not is judged (step S44). If not (step S44 False), a time-slot which is one slot behind of the time-slot TSa is newly set as TSa (step S42), and whether this time-slot TSa is vacant or not is judged (step S43). If this time-slot TSa is vacant (step S43 True), the disk access DAa of the immediately previous TSa setting can be moved backward to this time-slot TSa, so that all the consecutive disk accesses DAa which are allocated to the time-slots checked as TSa are moved backward by one slot to realize the backward moving (step S50).

In a case where the tolerable jitter range of the disk access DAa will be exceeded when the disk access DAa is moved backward (step S44 True), a moving range is set as a range which is in the tolerable jitter range of the disk access DAa and behind of the current head for the disk access DAa (step S45). Then, for each time-slot TSb within this moving range and a disk access DAb allocated to this time-slot TSb (step S46), whether the tolerable jitter range of the disk access DAb extends further behind of the tolerable jitter range of the disk access DAa or not is judged (step S47). In other words, when a group of disk accesses which is a target of displacement contains a disk access DAa which exceeds its own tolerable jitter range when displaced backward by one time-slot, another disk access DAb which exists within that tolerable jitter range of the disk access DAa and which has its own tolerable jitter range extending further behind is searched.

When such a disk access DAb is found, the disk access DAa and the disk access DAb are exchanged (step S48), and the processing returns to the step S42 described above. In this manner, the backward moving of a group of consecutive disk accesses by one time-slot becomes possible at the step S50. In a case such a disk access DAb cannot be found, it is regarded that the backward moving of the disk access at the time-slot TSa as initially set at the step S41 is impossible (step S49).

Similarly, in the forward moving procedure of FIG. 20, a method for displacing a group of consecutive disk access group on the slot ring together forward by one time-slot is adopted.

First, the time-slot to be released by the forward moving is set as TSc (step S51), and a disk access allocated to this time-slot will be referred to as DAc. At first, this time-slot TSc is not vacant (step S53 False), so next, whether the tolerable jitter range of the disk access DAc or the current head for the disk access DAc will be exceeded when the disk access DAc is moved forward or not is judged (step S54). If not (step S54 False), a time-slot which is one slot ahead of the time-slot TSc is newly set as TSc (step S52), and whether this time-slot TSc is vacant or not is judged (step S53). If this time-slot TSc is vacant (step S53 True), the disk access DAc of the immediately previous TSc setting can be moved forward to this time-slot TSc, so that all the consecutive disk accesses DAc which are allocated to the time-slots checked as TSc are moved forward by one slot to realize the forward moving (step S61).

In a case where the tolerable jitter range of the disk access DAc or the current head for the disk access DAc will be exceeded when the disk access DAc is moved forward (step S54 True), a moving range is set as a range which is in the tolerable jitter range of the disk access DAc and behind of the current head for the disk access DAc (step S55). Then, for each time-slot TSd within this moving range and a disk access DAd allocated to this time-slot TSd (step S56), whether the tolerable jitter range of the disk access DAd extends further ahead of the tolerable jitter range of the disk access DAc or not is judged (step S57), and whether the time-slot TSc is behind of the current head for the disk access DAd by two or more slots or not is judged (step S58). In other words, when a group of disk accesses which is a target of displacement contains a disk access DAc which exceeds its own tolerable jitter range or its current head when displaced forward by one time-slot, another disk access DAd which exists within that tolerable jitter range of the disk access DAc and which has its own tolerable jitter range extending further ahead and its current head at least two slots ahead of the disk access DAc is searched.

When such a disk access DAd is found, the disk access DAc and the disk access DAd are exchanged (step S59), and the processing returns to the step S52 described above. In this manner, the forward moving of a group of consecutive disk accesses by one time-slot becomes possible at the step S61. In a case such a disk access DAd cannot be found, it is regarded that the forward moving of the disk access at the time-slot TSc as initially set at the step S51 is impossible (step S49).

In addition, in the stream scheduling apparatus 2, the forward pull back processing for the disk access which is moved backward by the connection request processing is carried out in every one slot time. In this second embodiment, the disk access allocated to the time-slot pointed by the head is set as a target of the forward pull back processing.

Figure 21A:
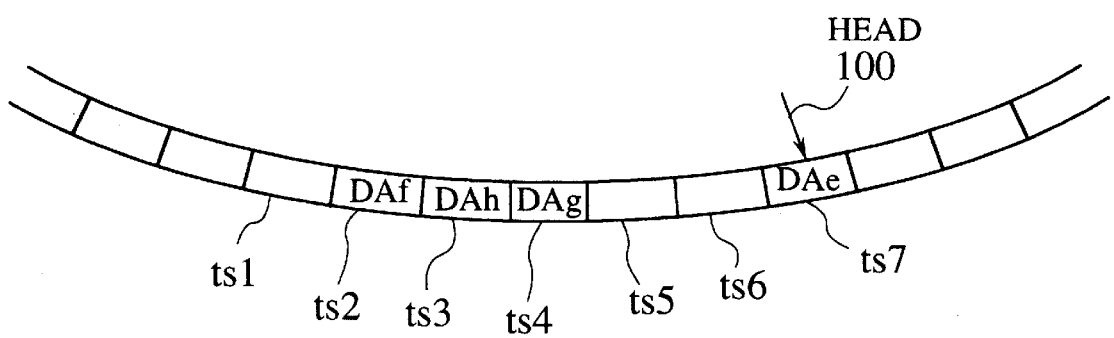
FIGS. 21A, 21B and 21C are diagrams for explaining the forward pull back processing to be carried out in the real time stream server of FIG. 14.
Figure 21B:
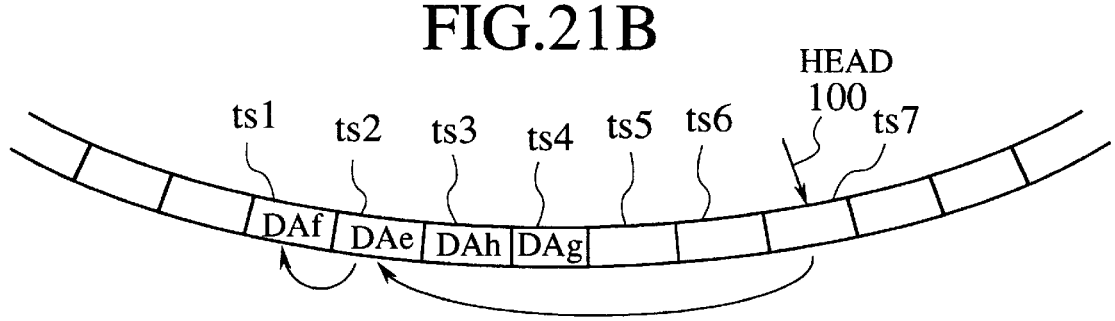
Figure 21C:
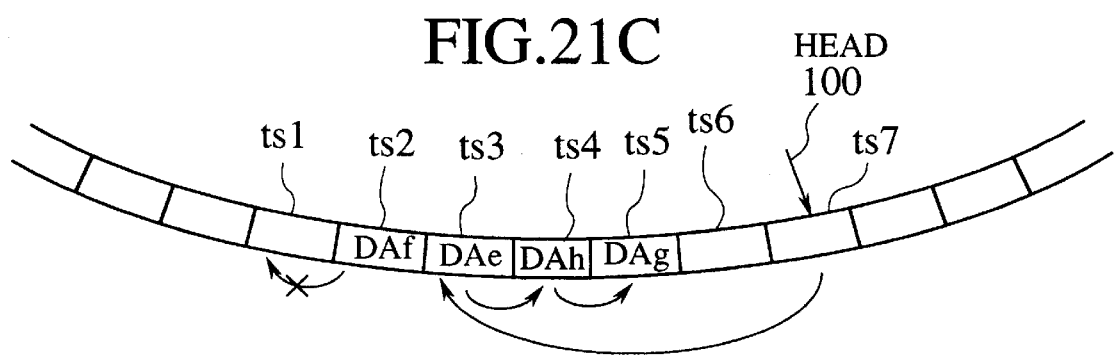

Examples of this forward pull back processing are illustrated in FIGS. 21A, 21B and 21C, in which FIG. 21A indicates a state before the forward pull back processing where the disk access DAe allocated to the time-slot ts7 and pointed by the head 100 is the forward pull back target disk access, FIG. 21B indicates a result of the forward pull back processing in a case where a disk access DAf can be moved forward, and FIG. 21C indicates a result of the forward pull back processing in a case where a disk access DAf cannot be moved forward but disk accesses DAg and DAh can be moved backward.

In FIGS. 21A, 21B and 21C, those time-slots which are within the tolerable jitter range, ahead of the time-slot ts7 as shown in FIGS. 21A, 21B and 21C to which the pull back target disk access DAe is allocated, and behind of the current head for the disk access DAe are going to be candidates for the time-slot to allocate the disk access DAe after the pull back.

First, among the disk accesses allocated to these candidates, the disk access DAf which has the reference time-slot ahead of the reference time-slot of the disk access DAe is searched. In a case where this disk access DAf exists, this disk access DAf is moved forward and the disk access DAe is moved to a vacated time-slot as in a time-slot ts2 shown in FIG. 21B. In a case where the forward moving of the disk access DAf is impossible, the time-slot ts3 as shown in FIGS. 21A, 21B and 21C which is next to this disk access DAf is released by the backward moving procedure with respect to the disk accesses DAh and DAg, and the disk access DAe is moved to that vacated time-slot ts3 as shown in FIG. 21C. In a case where the disk access DAf does not exist, a time-slot which is the most ahead among the allocation candidate time-slots is released by the backward moving procedure, and the disk access DAe is moved to that vacated time-slot.

Now, when the stream scheduling apparatus 2 which operates as described above is actually operated in the real time stream server of FIG. 14, the response time with respect to the connection request becomes as follows.

As an example, it is assumed that 32 sets of the real time data with 60 seconds reproduction time are prepared, and these real time data are stored in disks using different heads for different real time data as top heads of striping in real time unit. It is also assumed that there are 256 sets of clients existing, and the time limit is set to be 1.125 second. An average response time is measured for a case in which an average request interval of each client is set to make an average connected stream number to be i×8 (i=16, 17, . . . , 32) and the stream scheduling apparatus 2 is operated for ten minutes for each value of i under this condition.

Figure 22:
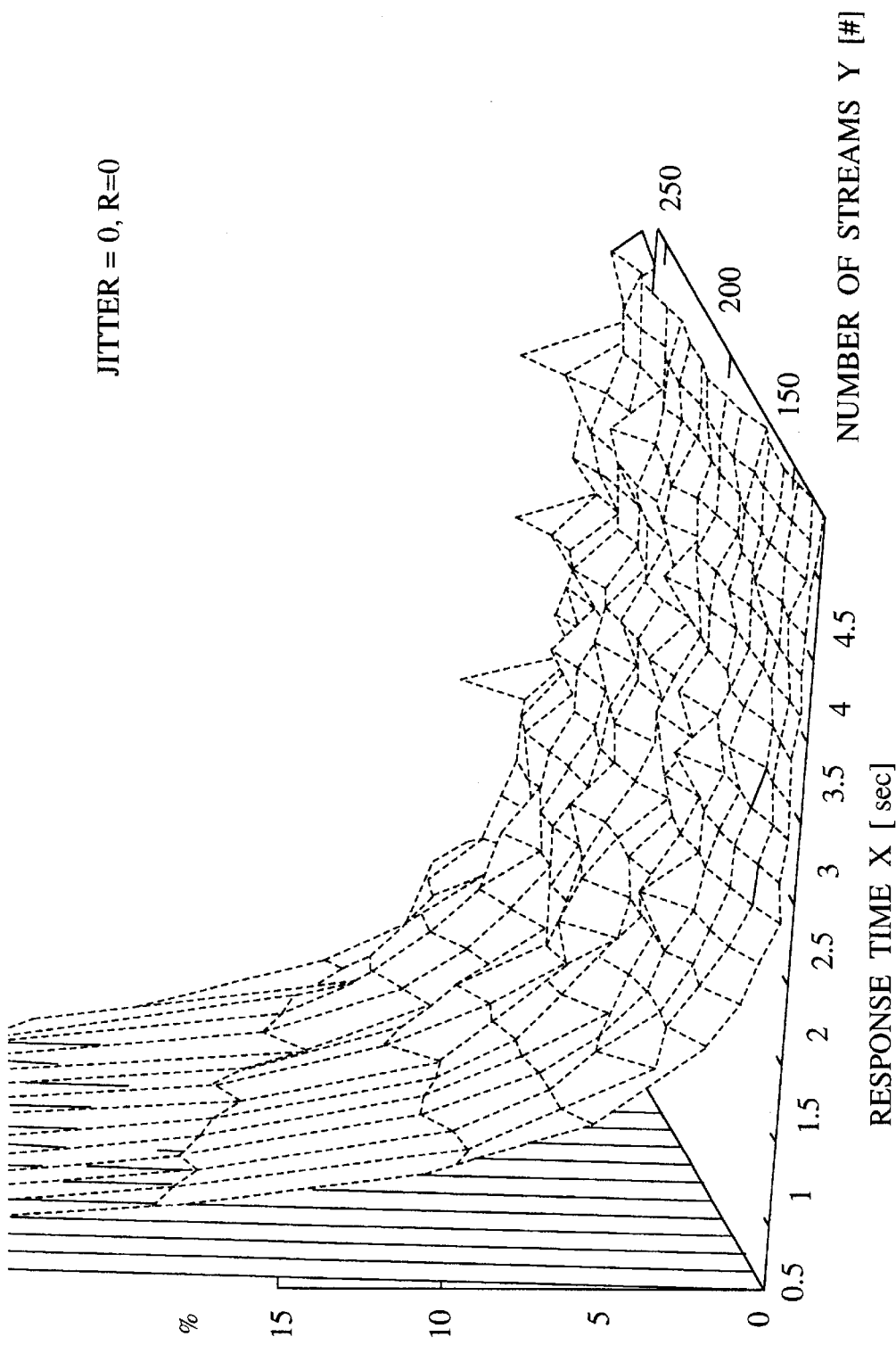
FIG. 22 is a histogram of response time obtained by a conventional stream scheduling scheme under one exemplary condition.
Figure 23:
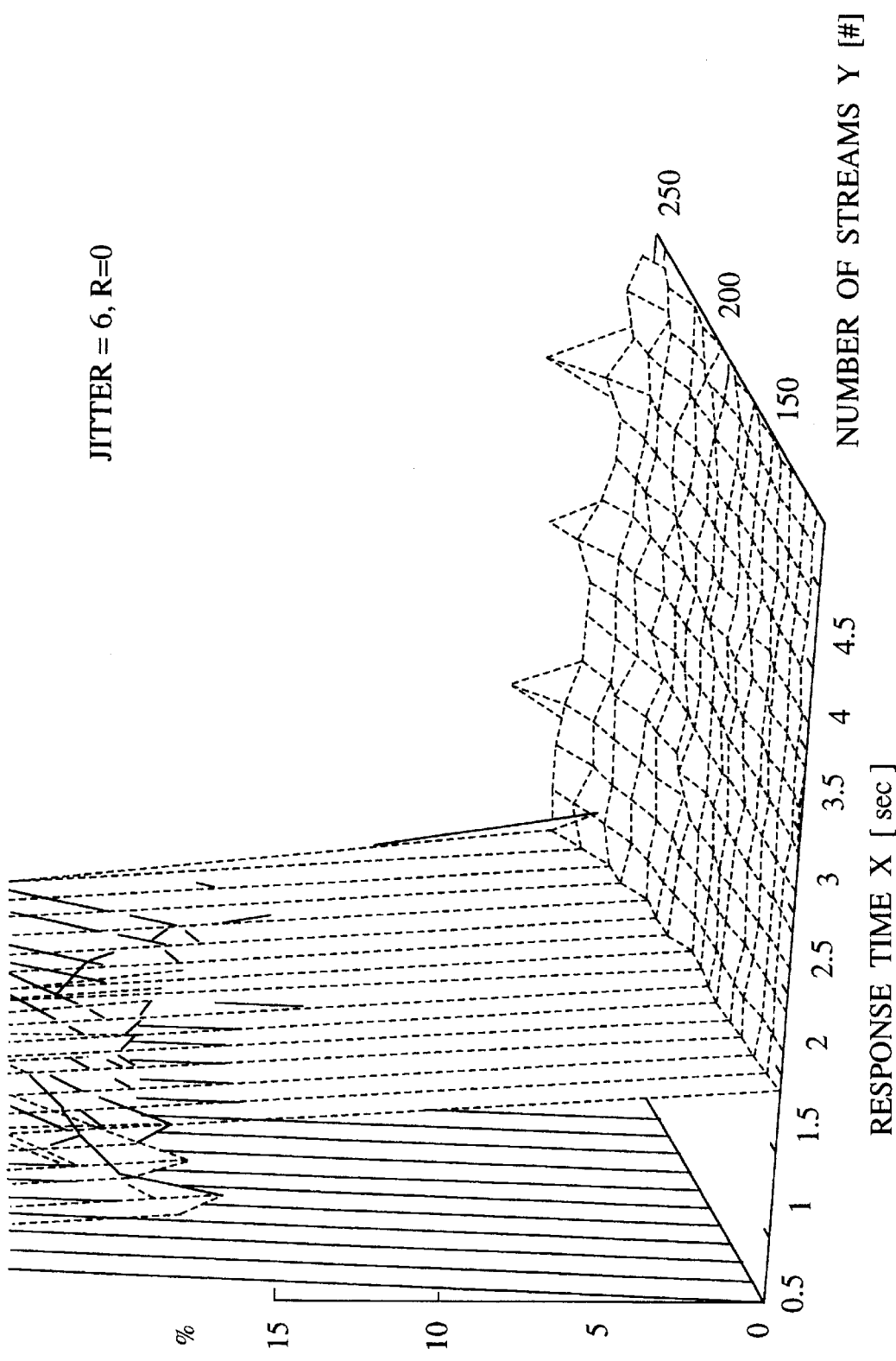
FIG. 23 is a histogram of response time obtained by a stream scheduling scheme according to the present invention under the same exemplary condition as in FIG. 22.

FIG. 22 shows a histogram of the response time X for the connection requests, which arrived at a point where the average connected stream number is Y, obtained by the measurement as described above in a case of scheduling by the conventional scheme (i.e., a case in which the concentration level affected range R=0 and the maximum jitter number J=0). In contrast, FIG. 23 shows a histogram of the response time X for the connection requests, which arrived at a point where the average connected stream number is Y, obtained by the measurement as described above in a case of scheduling by the scheme of this second embodiment (i.e., a case in which the concentration level affected range R=128 and the maximum jitter number J=6).

It can be seen that, in comparison with the conventional case, a probability for the response time to exceed the time limit becomes considerably smaller in this second embodiment.

Next, a case in which a buffer memory capacity that can be used by each stream is increased twice as much as the above noted example will be shown. In this case, 1 GB will be necessary for the buffer memory. Assuming that the data transfer bit rate Tb from the buffer to the client is 2 MBps and the maximum delay time of the disk access is one slot time, the maximum jitter number J will be given by:

$$J \leq 4 \times 8 - 1 - (2 \times 4/2) - 1 = 26$$

according to the above described equation (1).

FIG. 24 shows an exemplary histogram of the response time X measured under the similar condition as described above, in a case in which the concentration level affected range R=128 and the maximum Jitter number J=26.

As the maximum jitter number is made larger compared with the above example of FIG. 23, the probability for the response time to exceed the time limit becomes even smaller in FIG. 24. When it is operated with the maximum number of connectable streams equal to about 240, it is possible to make a response within the time limit in almost all cases. More specifically, according to the simulation conducted by the present inventors, for a case of using 232 streams and the limit time of 1.5 second, the probability for the response time to exceed the time limit is 0.12% in a case of scheduling by the scheme of this second embodiment, in contrast to 50.1% in a case of scheduling by the conventional scheme.

According to this second embodiment, even when there exists a bias as the positions of the current heads at a time of the connection request are concentrated on the slot ring, this bias can be resolved according to the specified time limit and the maximum jitter number, while guaranteeing the continuity of the stream.

Consequently, even when services are provided for many streams simultaneously, it is possible to increase the probability for being able to find the time-slot to which the disk access can be allocated in such a manner that it becomes possible to make a response within the specified time limit. Thus, the probability for being possible to make a response within the time limit can be increased.

It is also to be noted that the above described embodiments according to the present invention may be conveniently implemented using a conventional general purpose digital computer programmed according to the teachings of the present specification, as will be apparent to those skilled in the computer art. Appropriate software coding can readily be prepared by skilled programmers based on the teachings of the present disclosure, as will be apparent to those skilled in the software art.

For example, it is readily possible to provide a computer which is equipped with the data memory device 3, the buffer memory device 4, and the data transfer device 5 of FIG. 5 and connected to the communication network 6, and which has a computer program realizing functions of the schedule management unit 24, the data access control unit 25, and the data transfer control unit 26. Then, a computer program realizing the connection request processing unit 21, the reference schedule management unit 22, and the schedule update unit 23 can be installed into this computer, and this computer can be operated to execute the processing according to the flow charts of FIG. 17 and FIG. 18 at least. In this manner, the real time stream server 1 of FIG. 5 can be implemented as a software package installed on a general purpose computer in practice.

Such a software package can be a computer program product which employs a storage medium including stored computer code which is used to program a computer to perform the disclosed function and process of the present invention. The storage medium may include, but is not limited to, any type of conventional floppy disc, optical discs, CD-ROMs, magneto-optical discs, ROMs, RAMs, EPROMs, EEPROMs, magnetic or optical cards, or any other suitable media for storing electronic instructions.

As described above, according to one aspect of the present invention, when it is requested to transfer some real time stream data from a request source (client), a reference for timing of transfer which can guarantee a continuity of a steam is determined for that real time stream server first. Then, on a basis of this reference for timing of transfer, by what time the reading must be carried out at the latest in order to guarantee the continuity of the stream at the client side is defined.

Here, in practice, there is no need to carry out the reading at a point defined according to the above reference for timing of transfer, and it suffices to have the reading finished by then. However, the timing of actual reading have to be after a completion of the transfer of the prior data block corresponding to the same buffer memory device. For this reason, the timing for reading to be actually carried out can be determined appropriately within a prescribed tolerable range since that time of completion of the transfer until the above point defined on basis of the above reference for timing of transfer.

This timing for reading to be actually carried out is not necessarily a fixed one, and can be changed according to the need.

Also, according to another aspect of the present invention, a reference time-slot for reading to define a timing for transfer which can guarantee a continuity of a steam is stored for each real time stream data first. In other words, the reference time-slot is a time-slot which becomes a reference for the purpose of defining in relative times, by what time the reading must be carried out at the latest, from what time the reading is possible at the earliest, and by what time the transfer must be carried out, in order to guarantee the continuity of the stream at the request source (client) side.

Then, when it is requested to transfer some real time stream data from the client, if it is possible to carry out the re-allocation of the time-slot in which the reading should be actually carried out for the other real time stream data, that is, if it is possible to move this time-slot in which the reading should be actually carried out within a range for satisfying the reference time-slot for that other real time stream data, then it is possible to move a vacant time-slot by carrying out the re-allocation of the time-slot, so that it is possible to carry out the actual reading of the requested real time stream data using this moved vacant time-slot.

In other words, a fixed timing which becomes a reference for reading and transfer that can guarantee the continuity of the stream is determined first, and then, with this timing as a starting point, the (changeable) timing for the reading to be actually carried out is determined. Consequently, it is possible to vacate the already allocated time-slot which is ahead of the closest vacant time-slot on a time axis, and allocate this vacated time-slot to a new stream, so that it is possible to reduce the response time compared with a conventional case.

Also, in a case of setting up a time limit for the response time, it is possible to increase the probability for being able to find the time-slot to which the timing for reading can be allocated in such a manner that it becomes possible to make a response within the specified time limit, and therefore it becomes possible to increase the probability for being possible to make a response within the time limit.

Also, according to another aspect of the present invention, when it is requested to transfer some real time stream data from the request source (client), candidates for a reference time-slot for reading to define a timing for transfer which can guarantee a continuity of a steam for that real time stream data are selected first. In other words, the reference time-slot is a time-slot which becomes a reference for the purpose of defining in relative times, by what time the reading must be carried out at the latest, from what time the reading is possible at the earliest, and by what time the transfer must be carried out, in order to guarantee the continuity of the stream at the request source (client) side.

Here, however, those time-slots for which a response time since a point at which a request is received until the transfer of a first data block of that real time stream data starts is within a prescribed time limit are selected as the candidates for the reference time-slot.

In a case where there are several candidates for the reference time-slot, for each case of adopting each candidate as the reference time-slot, a dispersion of timewise positions of a part or a whole of the already existing reference time-slots and that candidate which is adopted as the reference time-slot is evaluated, and as a result of the evaluation, the candidate for the reference time-slot which gives the largest dispersion will be adopted as the scheduling result.

As a result of this scheduling, it is possible to disperse vacant time-slots without any timewise bias, and it is possible to increase the probability for the vacant time-slot to exist at a position which is a short time from a point at which a request of a new stream is received. Consequently, it is possible to increase the probability for being able to find the time-slot to which the timing for reading can be allocated in such a manner that it becomes possible to make a response within the specified time limit, and therefore it becomes possible to increase the probability for being possible to make a response within the time limit.

Also, according to another aspect of the present invention, when it is requested to transfer some real time stream data from the request source (client), candidates for a reference time-slot for reading to define a timing for transfer which can guarantee a continuity of a steam for that real time stream data are selected first. In other words, the reference time-slot is a time-slot which becomes a reference for the purpose of defining in relative times, by what time the reading must be carried out at the latest, from what time the reading is possible at the earliest, and by what time the transfer must be carried out, in order to guarantee the continuity of the stream at the request source (client) side.

Here, in a case where there are several candidates for the reference time-slot, for each case of adopting each candidate as the reference time-slot, a dispersion of timewise positions of a part or a whole of the already existing reference time-slots and that candidate which is adopted as the reference time-slot is evaluated, and as a result of the evaluation, the candidate for the reference time-slot which gives the largest dispersion will be adopted as the scheduling result.

Then, similarly as described above, the candidate for a time-slot in which the reading should actually be carried out is selected within a prescribed tolerable range determined according to the selected reference time-slot.

Here, in a case where the selected candidate for this time-slot is a vacant time-slot, it is possible to adopt the corresponding candidate for the reference time-slot and this candidate for a time-slot as the scheduling result.

In a case where the other real time stream data which are already allocated to that time-slot which is chosen as the candidate, if it is possible to carry out the re-allocation of the time-slot for that other real time stream data, that is, if it is possible to move this time-slot within a range for satisfying the reference time-slot for that other real time stream data, then it is possible to vacate that time-slot which is chosen as the candidate by carrying out the re-allocation of the time-slot, so that it is possible to adopt the corresponding candidate for the reference time-slot and that candidate for a time-slot as the scheduling result.

Consequently, it is possible to vacate the already allocated time-slot which is ahead of the closest vacant time-slot on a time axis, and allocate this vacated time-slot to a new stream, so that it is possible to reduce the response time compared with a conventional case.

Also, it is possible to disperse vacant time-slots or time-slots that can be vacated without any timewise bias by dispersing the reference time-slots, and it is possible to increase the probability for the vacant time-slot to exist at a position which is a short time from a point at which a request of a new stream is received.

Also, in a case of setting up a time limit for the response time, it is possible to increase the probability for being able to find the time-slot to which the timing for reading can be allocated in such a manner that it becomes possible to make a response within the specified time limit, and therefore it becomes possible to increase the probability for being possible to make a response within the time limit.

According to another aspect of the present invention, when it is requested to transfer some real time stream data from the request source (client), the connection request processing unit selects a reference schedule for the requested real time stream data which can start the transfer within a prescribed time limit from a point at which a request is received, and determines an operation schedule for actually carrying out the reading and the transfer within a prescribed tolerable time range based on that selected reference schedule.

At that time, the schedule update unit updates the operation schedule in a range for satisfying the reference schedule, for the real time stream data that are being transferred.

Consequently, it is possible to vacate the already allocated time-slot which is ahead of the closest vacant time-slot on a time axis, and allocate this vacated time-slot to a new stream, so that it is possible to reduce the response time compared with a conventional case.

Also, it is possible to increase the probability for being able to find the time-slot to which the timing for reading can be allocated in such a manner that it becomes possible to make a response within the specified time limit, and therefore it becomes possible to increase the probability for being possible to make a response within the time limit.

According to another aspect of the present invention, when it is requested to transfer some real time stream data from the request source (client), the connection request processing unit selects a reference schedule for the requested real time stream data which can start the transfer within a prescribed time limit from a point at which a request is received, for which a timewise concentration level of a part or a whole of reference schedules is small when this reference schedule is selected, and determines an operation schedule for actually carrying out the reading and the transfer within a prescribed tolerable time range based on that selected reference schedule.

Then, the respective control units command the reading and the transfer of the data blocks according to the determined operation schedule.

As a result of this scheduling, it is possible to disperse vacant time-slots without any bias timewise, and it is possible to increase the probability for the vacant time-slot to exist at a position which is a short time from a point at which a request of a new stream is received.

Also, it is possible to increase the probability for being able to find the time-slot to which the timing for reading can be allocated in such a manner that it becomes possible to make a response within the specified time limit, and therefore it becomes possible to increase the probability for being possible to make a response within the time limit.

It is to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A stream scheduling method for determining a timing for reading data blocks constituting real time stream data, each real time stream data being stored in a data memory device as a plurality of data blocks, in a real time stream server which sequentially reads out data blocks of requested real time stream data from the data memory device to a buffer memory device at respective reading timings, and transfers the data blocks stored in the buffer memory device to a communication path connected with a request source at respective transfer timings, the method comprising the steps of:

determining a reference for transfer timing which can guarantee a continuity of a stream for the requested real time stream data; and setting a reading timing movably within a prescribed tolerable range defined with respect to the reference for transfer timing such that the reading timing can subsequently be reallocated within the prescribed tolerable range.

2. The stream scheduling method of claim 1, wherein the prescribed tolerable range is defined to be extending ahead on a time axis from the reference for transfer timing.

3. The stream scheduling method of claim 1, wherein the prescribed tolerable range is defined by a maximum jitter number J which indicates a maximum possible number of time-slots by which the reading timing can be separated from the reference for transfer timing and which is given by:

$$J \leq BM-D-T-1$$

where B is a ratio of a size of a buffer memory in the buffer memory device that can be used by one stream and a size of one block of the real time stream data, M is a reproduction time for one block at the request source, T is a transfer time for one block at the request source, and D is an estimated maximum delay time in a case where an end time of the reading exceeds an end time of a time-slot to which the reading is allocated.

4. The stream scheduling method of claim 1, wherein the reference for transfer timing provides a reference in defining in relative times, by what time the reading must be carried out at latest, from what time the reading is possible at earliest, and by what time the transfer must be carried out, in order to guarantee the continuity of the stream at the request source.

5. The stream scheduling method of claim 1, further comprising the step of determining a transfer timing in a prescribed relation to the reference for transfer timing.

6. A stream scheduling method for allocating a time-slot for reading data blocks constituting real time stream data, each real time stream data being stored in a data memory device as a plurality of data blocks, in a real time stream server which sequentially reads out data blocks of requested real time stream data from the data memory device to a buffer memory device at respective reading timings, and transfers the data blocks stored in the buffer memory device to a communication path connected with a request source at respective transfer timings according to time-slots defining periodic operation timings, the method comprising the steps of:

storing a reference time-slot for defining a transfer timing which can guarantee a continuity of a stream for each real time stream data;

receiving a request for a transfer of a new real time stream data;

re-allocating a time-slot for a reading of another real time stream data within a prescribed tolerable range defined with respect to the reference time-slot stored for said another real time stream data so as to create a vacant time-slot; and allocating a reading of said new real time stream data to the vacant time-slot created by re-allocation.

7. The stream scheduling method of claim 6, wherein the re-allocating step creates the vacant time-slot which is also within a prescribed tolerable range defined with respect to the reference time-slot stored for said new real time stream data.

8. The stream scheduling method of claim 6, wherein the re-allocation is carried out with respect to a currently transferred real time stream data for which a time-slot for a reading can be moved to create the vacant time-slot.

9. The stream scheduling method of claim 6, wherein a reading of each real time stream data is allocated to a time-slot which is as far ahead on a time axis as possible within the prescribed tolerable range defined with respect to the reference time-slot stored for each real time stream data.

10. The stream scheduling method of claim 6, wherein the reference time-slot for said new real time stream data is set to be a time-slot for which a time-slot for a reading of said new real time stream data is within the prescribed tolerable range, and for which a timewise concentration level of reference time-slots for a plurality of real time stream data is relatively small.

11. The stream scheduling method of claim 6, wherein the reading of said new real time stream data is allocated movably within the prescribed tolerable range defined with respect to the reference time-slot for said new real time stream data.

12. The stream scheduling method of claim 6, wherein the prescribed tolerable range is defined by a maximum jitter number J which indicates a maximum possible number of time-slots by which a time-slot to which the reading is allocated can be separated from the reference time-slot and which is given by:

$$J \leq BM - D - T - 1$$

where B is a ratio of a size of a buffer memory in the buffer memory device that can be used by one stream and a size of one block of the real time stream data, M is a reproduction time for one block at the request source, T is a transfer time for one block at the request source, and D is an estimated maximum delay time in a case where an end time of the reading exceeds an end time of a time-slot to which the reading is allocated.

13. The stream scheduling method of claim 6, wherein the reference time-slot provides a reference in defining in relative times, by what time the reading must be carried out at latest, from what time the reading is possible at earliest, and by what time the transfer must be carried out, in order to guarantee the continuity of the stream at the request source.

14. The stream scheduling method of claim 6, wherein the re-allocation is carried out by moving the reading of said another real time stream data forward on a time axis within a prescribed tolerable range defined with respect to the reference time-slot stored for said another real time stream data, and by moving the reading of said another real time stream data backward on a time axis within a prescribed tolerable range defined with respect to the reference time-slot stored for said another real time stream data when the reading of said another real time stream data cannot be moved forward.

15. The stream scheduling method of claim 6, further comprising the step of:

carrying out a forward pull back processing to regularly move the reading of each real time stream data forward as much as possible on a time axis within a prescribed tolerable range defined with respect to the reference time-slot stored for each real time stream data.

16. A stream scheduling method for allocating a time-slot for reading data blocks constituting real time stream data, each real time stream data being stored in a data memory device as a plurality of data blocks, in a real time stream server which sequentially reads out data blocks of requested real time stream data from the data memory device to a buffer memory device at respective reading timings, and transfers the data blocks stored in the buffer memory device to a communication path connected with a request source at respective transfer timings according to time-slots defining periodic operation timings, the method comprising the steps of:

selecting candidate time-slots for which a response time does not exceed a specified time limit, as candidates for a reference time-slot for defining a transfer timing which can guarantee a continuity of a stream for the requested real time stream data, the response time being defined as a time period since a time at which a request is received until a time at which a transfer of a first data block of the requested real time stream data starts;

evaluating each candidate time-slot selected at the selecting step on a basis of a dispersion of timewise positions of reference time-slots for a plurality of real time stream data estimated on an assumption of adopting each candidate time-slot; and allocating a reading of the requested real time stream data to a time-slot in relation to one of the candidate time-slots which is adopted as the reference time-slot according to an evaluation made at the evaluating step.

17. The stream scheduling method of claim 16, wherein the specified time limit is determined according to a data length of the requested real time stream data.

18. The stream scheduling method of claim 16, wherein the specified time limit is determined according to an access scheme used for the requested real time stream data.

19. The stream scheduling method of claim 16, wherein the evaluating step evaluates each candidate time-slot on a basis of a remaining time of each currently transferred real time stream data in addition to the dispersion.

20. The stream scheduling method of claim 16, wherein the evaluating step evaluates each candidate time-slot by using an evaluation function indicating a concentration level of timewise positions of reference time-slots for a plurality of real time stream data at each time-slot.

21. The stream scheduling method of claim 16, wherein the reference time-slot provides a reference in defining in relative times, by what time the reading must be carried out at latest, from what time the reading is possible at earliest, and by what time the transfer must be carried out, in order to guarantee the continuity of the stream at the request source.

22. A stream scheduling method for allocating a time-slot for reading data blocks constituting real time stream data, each real time stream data being stored in a data memory device as a plurality of data blocks, in a real time stream server which sequentially reads out data blocks of requested real time stream data from the data memory device to a buffer memory device at respective reading timings, and transfers the data blocks stored in the buffer memory device to a communication path connected with a request source at respective transfer timings according to time-slots defining periodic operation timings, the method comprising the steps of:

selecting a candidate reference time-slot for defining a transfer timing which can guarantee a continuity of a stream for the requested real time stream data, according to an evaluation of a dispersion of timewise positions of reference time-slots for a plurality of real time stream data estimated on an assumption of adopting each time-slot;

selecting a candidate reading time-slot for a reading of the requested real time stream data, within a prescribed tolerable range defined with respect to the selected candidate reference time-slot; and allocating a reading of the requested real time stream data by adopting the candidate reference time-slot and the candidate reading time-slot as the reference time-slot and the reading time-slot for the requested real time stream data when the selected reading time-slot can be regarded as a vacant time-slot.

23. The stream scheduling method of claim 22, wherein the selected reading time-slot can be regarded as a vacant time-slot when the selected reading time-slot is already vacant, or when a reading of another real time stream data already allocated to the selected candidate reading time-slot can be re-allocated to another time-slot within a prescribed tolerable range defined with respect to the reference time-slot for said another real time stream data.

24. The stream scheduling method of claim 22, wherein the candidate reading time-slot adopted as the reading time-slot for the requested real time stream data is a time-slot which is as far ahead on a time axis as possible within the prescribed tolerable range defined with respect to the reference time-slot and to which the reading of the requested real time stream data can be allocated.

25. The stream scheduling method of claim 22, wherein the candidate reference time-slot adopted as the reference time-slot for the requested real time stream data is a time-slot for which the reading time-slot is within the prescribed tolerable range, and for which a timewise concentration level of reference time-slots for a plurality of real time stream data is relatively small.

26. The stream scheduling method of claim 22, wherein the reading time-slot is set movably within the prescribed tolerable range defined with respect to the reference time-slot.

27. The stream scheduling method of claim 22, wherein the prescribed tolerable range is defined by a maximum jitter number J which indicates a maximum possible number of time-slots by which a time-slot to which the reading is allocated can be separated from the reference time-slot and which is given by:

$$J \leq BM-D-T-1$$

where B is a ratio of a size of a buffer memory in the buffer memory device that can be used by one stream and a size of one block of the real time stream data, M is a reproduction time for one block at the request source, T is a transfer time for one block at the request source, and D is an estimated maximum delay time in a case where an end time of the reading exceeds an end time of a time-slot to which the reading is allocated.

28. The stream scheduling method of claim 22, wherein the reference time-slot provides a reference in defining in relative times, by what time the reading must be carried out at latest, from what time the reading is possible at earliest, and by what time the transfer must be carried out, in order to guarantee the continuity of the stream at the request source.

29. A stream scheduling apparatus for determining a schedule for reading data blocks constituting real time stream data, the apparatus comprising:

connection request processing means for determining a reference schedule for a requested real time stream data which can guarantee a continuity of a stream for the requested real time stream data, and an operation schedule for the requested real time stream data indicating at least reading timings for the requested real time stream data according to which a reading of the requested real time stream data can be carried out within a prescribed tolerable range defined with respect to the reference schedule for the requested real time stream data; and operation schedule update means for updating the operation schedule for a currently transferred real time stream data within the prescribed tolerable range defined with respect to the reference schedule for the currently transferred real time stream data.

30. The stream scheduling apparatus of claim 29, wherein the operation schedule update means updates the operation schedule for the currently transferred real time stream data at least at a time of determining the operation schedule for a currently requested real time stream data.

31. The stream scheduling apparatus of claim 29, further comprising:

control means for controlling reading and transfer of the data blocks of the requested real time stream data and the currently transferred real time stream data, according to the operation schedule for the requested real time stream data determined by the connection request processing means and the operation schedule for the currently transferred real time stream data updated by the operation schedule update means.

32. A stream scheduling apparatus for determining a schedule for reading and transfer of data blocks constituting real time stream data, the apparatus comprising:

connection request processing means for determining a reference schedule for a requested real time stream data which can guarantee a continuity of a stream for the requested real time stream data on a basis of a dispersion of timewise positions of reference schedules for a plurality of real time stream data estimated on an assumption of adopting said reference schedule, and an operation schedule for the requested real time stream data indicating at least reading timings for the requested real time stream data according to which the reading of the requested real time stream data can be carried out within a prescribed tolerable range defined with respect to the reference schedule for the requested real time stream data; and control means for controlling the reading and the transfer of the data blocks of the requested real time stream data according to the operation schedule for the requested real time stream data determined by the connection request processing means.

33. A stream scheduling apparatus for determining a timing for reading data blocks constituting real time stream data, each real time stream data being stored in a data memory device as a plurality of data blocks, in a real time stream server which sequentially reads out data blocks of requested real time stream data from the data memory device to a buffer memory device at respective reading timings, and transfers the data blocks stored in the buffer memory device to a communication path connected with a request source at respective transfer timings, the apparatus comprising:

means for determining a reference for transfer timing which can guarantee a continuity of a stream for the requested real time stream data; and means for setting a reading timing movably within a prescribed tolerable range defined with respect to the reference for transfer timing such that the reading timing can subsequently be re-allocated within the prescribed tolerable range.

34. A real time stream server for allocating a time-slot for reading data blocks constituting real time stream data, each real time stream data being stored in a data memory device as a plurality of data blocks, wherein the real time stream server sequentially reads out data blocks of requested real time stream data from the data memory device to a buffer memory device at respective reading timings, and transfers the data blocks stored in the buffer memory device to a communication path connected with a request source at respective transfer timings according to time-slots defining periodic operation timings, the real time stream server comprising:

means for storing a reference time-slot for defining a transfer timing which can guarantee a continuity of a stream for each real time stream data; and means for receiving a request for a transfer of a new real time stream data, re-allocating a time-slot for a reading of another real time stream data within a prescribed tolerable range defined with respect to the reference time-slot stored for said another real time stream data so as to create a vacant time-slot, and allocating a reading of said new real time stream data to the vacant time-slot created by re-allocation.

35. A real time stream server for allocating a time-slot for reading data blocks constituting real time stream data, each real time stream data being stored in a data memory device as a plurality of data blocks, wherein the real time stream server sequentially reads out data blocks of requested real time stream data from the data memory device to a buffer memory device at respective reading timings, and transfers the data blocks stored in the buffer memory device to a communication path connected with a request source at respective transfer timings according to time-slots defining periodic operation timings, the real time stream server comprising:

means for selecting candidate time-slots for which a response time does not exceed a specified time limit, as candidates for a reference time-slot for defining a transfer timing which can guarantee a continuity of a stream for the requested real time stream data, the response time being defined as a time period since a time at which a request is received until a time at which a transfer of a first data block of the requested real time stream data starts;

means for evaluating each candidate time-slot selected by the selecting means on a basis of a dispersion of timewise positions of reference time-slots for a plurality of real time stream data estimated on an assumption of adopting each candidate time-slot; and means for allocating a reading of the requested real time stream data to a time-slot in relation to one of the candidate time-slots which is adopted as the reference time-slot for reading according to an evaluation made by the evaluating means.

36. A real time stream server for allocating a time-slot for reading data blocks constituting real time stream data, each real time stream data being stored in a data memory device as a plurality of data blocks, wherein the real time stream server sequentially reads out data blocks of requested real time stream data from the data memory device to a buffer memory device at respective reading timings, and transfers the data blocks stored in the buffer memory device to a communication path connected with a request source at respective transfer timings according to time-slots defining periodic operation timings, the real time stream server comprising:

means for selecting a candidate reference time-slot for defining a transfer timing which can guarantee a continuity of a stream for the requested real time stream data, according to an evaluation of a dispersion of timewise positions of reference time-slots for a plurality of real time stream data estimated on an assumption of adopting each time-slot;

means for selecting a candidate reading time-slot for a reading of the requested real time stream data, within a prescribed tolerable range defined with respect to the selected candidate reference time-slot; and means for allocating a reading of the requested real time stream data by adopting the candidate reference time-slot and the candidate reading time-slot as the reference time-slot and the reading time-slot for the requested real time stream data when the selected reading time-slot can be regarded as a vacant time-slot.

37. An article of manufacture, comprising:

a computer usable medium having computer readable program code means embodied therein for causing a computer to function as a stream scheduler for determining a timing for reading data blocks constituting real time stream data, each real time stream data being stored in a data memory device as a plurality of data blocks, in a real time stream server which sequentially reads out data blocks of requested real time stream data from the data memory device to a buffer memory device at respective reading timings, and transfers the data blocks stored in the buffer memory device to a communication path connected with a request source at respective transfer timings, the computer readable program means including:

first computer readable program code means for causing the computer to determine a reference for transfer timing which can guarantee a continuity of a stream for the requested real time stream data; and second computer readable program code means for causing the computer to set a reading timing movably within a prescribed tolerable range defined with respect to the reference for transfer timing such that the reading timing can subsequently be re-allocated within the prescribed tolerable range.

38. An article of manufacture, comprising:

a computer usable medium having computer readable program code means embodied therein for causing a computer to function as a stream scheduler for allocating a time-slot for reading data blocks constituting real time stream data, each real time stream data being stored in a data memory device as a plurality of data blocks, in a real time stream server which sequentially reads out data blocks of requested real time stream data from the data memory device to a buffer memory device at respective reading timings, and transfers the data blocks stored in the buffer memory device to a communication path connected with a request source at respective transfer timings according to time-slots defining periodic operation timings, the computer readable program means including:

first computer readable program code means for causing the computer to store a reference time-slot for defining a transfer timing which can guarantee a continuity of a stream for each real time stream data; and second computer program code means for causing the computer to receive a request for a transfer of a new real time stream data, re-allocate a time-slot for a reading of another real time stream data within a prescribed tolerable range defined with respect to the reference time-slot stored for said another real time stream data so as to create a vacant time-slot, and allocate a reading of said new real time stream data to the vacant time-slot created by re-allocation.

39. An article of manufacture, comprising:

a computer usable medium having computer readable program code means embodied therein for causing a computer to function as a stream scheduler for allocating a time-slot for reading data blocks constituting real time stream data, each real time stream data being stored in a data memory device as a plurality of data blocks, in a real time stream server which sequentially reads out data blocks of requested real time stream data from the data memory device to a buffer memory device at respective reading timings, and transfers the data blocks stored in the buffer memory device to a communication path connected with a request source at respective transfer timings according to time-slots defining periodic operation timings, the computer readable program means including:

first computer readable program code means for causing the computer to select candidate time-slots for which a response time does not exceed a specified time limit, as candidates for a reference time-slot for defining a transfer timing which can guarantee a continuity of a stream for the requested real time stream data, the response time being defined as a time period since a time at which a request is received until a time at which a transfer of a first data block of the requested real time stream data starts;

second computer readable program code means for causing the computer to evaluate each candidate time-slot selected by the first computer readable program code means on a basis of a dispersion of timewise positions of reference time-slots for a plurality of real time stream data estimated on an assumption of adopting each candidate time-slot; and third computer readable program code means for causing the computer to allocate a reading of the requested real time stream data to a time-slot in relation to one of the candidate time-slots which is adopted as the reference time-slot according to an evaluation made by the second computer readable program code means.

40. An article of manufacture, comprising:

a computer usable medium having computer readable program code means embodied therein for causing a computer to function as a stream scheduler for allocating a time-slot for reading data blocks constituting real time stream data, each real time stream data being stored in a data memory device as a plurality of data blocks, in a real time stream server which sequentially reads out data blocks of requested real time stream data from the data memory device to a buffer memory device at respective reading timings, and transfers the data blocks stored in the buffer memory device to a communication path connected with a request source at respective transfer timings according to time-slots defining periodic operation timings, the computer readable program means including:

first computer readable program code means for causing the computer to select a candidate reference time-slot for defining a transfer timing which can guarantee a continuity of a stream for the requested real time stream data, according to an evaluation of a dispersion of timewise positions of reference time-slots for a plurality of real time stream data estimated on an assumption of adopting each time-slot;

second computer readable program code means for causing the computer to select a candidate reading time-slot for a reading of the requested real time stream data, within a prescribed tolerable range defined with respect to the selected candidate reference time-slot; and third computer readable program code means for causing the computer to allocate a reading of the requested real time stream data by adopting the candidate reference time-slot and the candidate reading time-slot as the reference time-slot and the reading time-slot for the requested real time stream data when the selected reading time-slot can be regarded as a vacant time-slot.

* * * * *